United States Patent
Endo

(10) Patent No.: US 7,116,497 B2
(45) Date of Patent: Oct. 3, 2006

(54) RETROFOCUS TYPE OPTICAL SYSTEM

(75) Inventor: Hiroshi Endo, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 11/116,082

(22) Filed: Apr. 27, 2005

(65) Prior Publication Data

US 2005/0243434 A1    Nov. 3, 2005

(30) Foreign Application Priority Data

Apr. 28, 2004    (JP)    ............... 2004-132609

(51) Int. Cl.
  *G02B 3/00*     (2006.01)
  *G02B 13/04*    (2006.01)

(52) U.S. Cl. ...................... 359/737; 359/749

(58) Field of Classification Search ................ 359/737, 359/749–753
  See application file for complete search history.

(56) References Cited

U.S. PATENT DOCUMENTS 4,913,535 A    4/1990    Robb 5,858,898 A *  1/1999    Nakahara et al. ............. 501/77
6,452,728 B1 * 9/2002    Shikama ..................... 359/651

FOREIGN PATENT DOCUMENTS

| EP | 1065531 | 1/2002 |
| JP | 2001-074901 | 3/2001 |

* cited by examiner

*Primary Examiner*—Scott J. Sugarman
*Assistant Examiner*—Darryl J. Collins
(74) *Attorney, Agent, or Firm*—Morgan & Finnegan, LLP

(57)    ABSTRACT

Provided is a retrofocus type optical system including a lens or a layer made of a material satisfying the following conditions of the Abbe constant $\nu d$ and partial dispersion ratios $\theta gd$ and $\theta gF$, $\nu d < 30$, $\theta gd < -3.333 \times 10^{-3} \cdot \nu d + 1.40$, $\theta gF < -2.615 - 10^{-3} \cdot \nu d + 0.67$.

In the case that this layer is disposed on the front side of the aperture stop, the layer is designed to have a positive refractive power, and in the case that the layer is disposed on the rear side of the aperture stop, the layer is designed to have a negative refractive index.

8 Claims, 14 Drawing Sheets

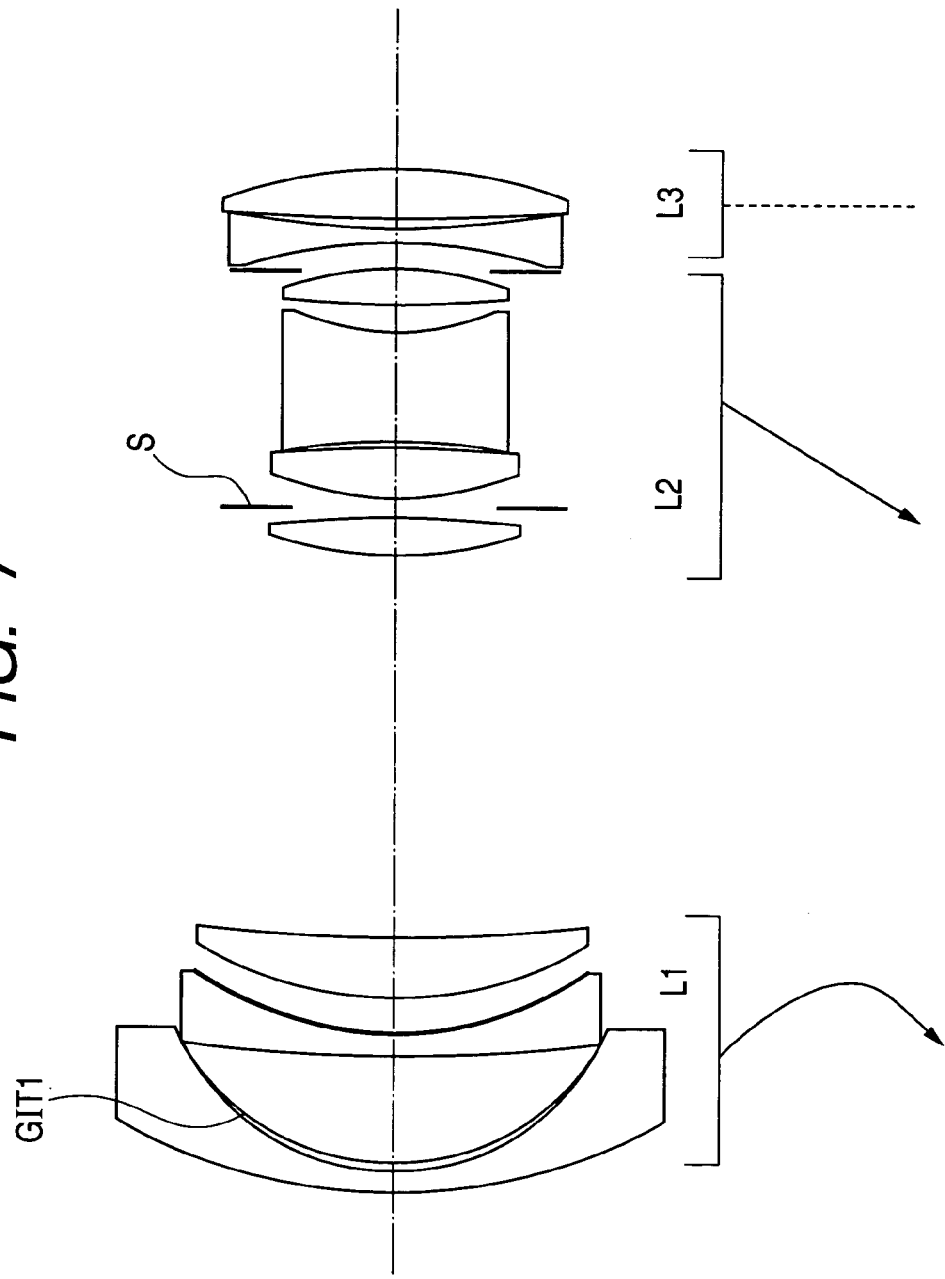

RETROFOCUS TYPE OPTICAL SYSTEM

BACKGROUND OF THE INVENTION

1. Field of the Invention

The present invention relates to an optical system in which an optical material with extraordinary partial dispersion is used, or an optical system that is suitable for an image taking optical system of a silver halide film camera, a digital still camera or a video camera, or a projection optical system of a liquid crystal projector.

2. Description of the Related Art

Conventionally, a retrofocus type lens has been known as a type of lens having a short focal length and a long back focus. In the retrofocus type lens, a long back focus can be realized by arranging a lens unit having negative refractive power as a whole in the front side (i.e. the magnification side: the object side in the case of a image taking optical system of camera and or the like, or the screen side in the case of a projection optical system of a projector or the like) of the optical system and arranging a lens unit having a positive refractive power as a whole in the rear side (i.e. the reduction side: the image side in the case of a image taking optical system of a camera or the like, or the original side in the case of a projection optical system of a projector or the like) of the optical system. In order to obtain a long back focus, it is necessary to enhance both the positive refractive power and the negative refractive power, which results in an optical system having an asymmetrical refractive power arrangement. Problems the retrofocus type lens suffers in correcting aberrations are that barrel type distortion is liable to occur, that significant chromatic aberration of magnification (lateral chromatic aberration) is liable to occur, and that secondary spectrum of chromatic aberration of magnification tends to become large.

As a conventional method for improving the chromatic aberration of magnification, a method of using a low dispersion lens made of extraordinary partial dispersion material such as fluorite and a method of using a diffraction optical surface have been proposed.

On the other hand, diffraction optical elements have an Abbe number equivalent value of as small as 3.45 (in the absolute value), and accordingly it is possible to change chromatic aberration greatly while scarcely affecting spherical aberration, coma and astigmatism etc. only by slightly changing the optical power (which is the reciprocal of the focal length) achieved by diffraction. In addition, since diffracted light is used, the optical power changes linearly depending on the wavelength of incident light, and the wavelength characteristics of the chromatic aberration coefficient is completely linear. Therefore, in order to shorten the total length of the system, aberration corrections should be mainly directed to spherical aberration, coma and astigmatism. As to chromatic aberration, since correction thereof is effected using a diffraction optical element, what is required in designing the system is only to optimize the material and optical power of the constituent lenses so as to realize linearity in the wavelength characteristics of the chromatic aberration without taking into consideration the absolute amount of the chromatic aberration that has been deteriorated by the length reduction. Thus, an optical system having excellent performance can be obtained as a consequence.

It has been proposed to use a resin material mixed with inorganic oxide fine particles such as ITO fine particles in a diffraction grating to improve the diffraction efficiency (see Japanese Patent Application Laid-Open No. 2001-074901 (a counterpart: EP A2 1065531).

Furthermore, a liquid material having relatively high dispersion and showing relatively extraordinary partial dispersion characteristics has been known as a material having a chromatic aberration correction effect similar to diffraction gratings, and an achromatic optical system using the same has been proposed (see U.S. Pat. No. 4,913,535).

Since the refractive index of a low dispersion lens with extraordinary partial dispersion such as a fluorite lens is low, its position in an optical system is limited when used, or it is sometimes necessary to increase the number of the lenses in the system. In addition, such lenses are very expensive and they cannot be used frequently in view of the cost.

Although diffraction optical elements have sufficient chromatic aberration correction effects, they suffer from the problem that diffracted light of useless diffraction orders different from the designed diffraction order becomes colored flare light that deteriorates imaging performance. Although in some cases, a so-called laminated diffraction optical element composed of a plurality of blazed diffraction gratings stacked along the optical axis direction is used so as to concentrate energy on the designed diffraction order and to reduce useless diffracted light greatly, there still remains the problem that diffracted flare is generated when an object having high luminance is photographed.

In manufacturing a diffraction optical element, a method of molding an ultraviolet curing resin or the like using a metal mold has been known. However, diffraction efficiency of a diffraction optical element is extremely sensitive to the manufacturing accuracy, and a very high degree of precision in the metal mold and in the molding process is required. This leads to high manufacturing costs.

The material disclosed in U.S. Pat. No. 4,913,535 is liquid, and a structure for sealing it is necessary and manufacturing thereof is not easy. In addition, it suffers from the problem of changes in characteristics, such as refractive index and dispersion characteristics, depending on the temperature, namely, it does not have sufficient environmental tolerance. In addition, that material suffers from the defect that it cannot achieve a sufficient chromatic aberration correction effect due to its relatively large Abbe constant, relatively small extraordinary partial dispersion and absence of interface with the air.

SUMMARY OF THE INVENTION

The present invention has been made in view of the above-described difficulties in the conventional arrangements. An object of the present invention is to provide a retrofocus type optical system that achieves favorable corrections of various aberrations represented by chromatic aberration, is easy to manufacture and has excellent environmental tolerance.

In an exemplary optical system according to the present invention, the height at which a paraxial marginal ray passes through the frontmost lens surface is smaller than the maximum value of the height at which the paraxial marginal ray passes through a lens surface on the rear side of the intersection P of the optical axis and a paraxial chief ray, and the optical system includes a refractive optical element made of a solid material that satisfies the following conditions concerning the Abbe constant $\nu d$ and partial dispersion ratios $\theta gd$ and $\theta gF$.

$\nu d < 30$ $\theta gd < -3.333 \times 10^{-3} \cdot \nu d + 1.40$ $\theta gF < -2.615 \times 10^{-3} \cdot \nu d + 0.67$ In this connection, in the case that this refractive optical element is disposed on the front side of (i.e. anterior to) the intersection P, the refractive optical element is designed to have a positive refractive power, and in the case that the refractive optical is disposed on the rear side of (i.e. posterior to) the intersection P, the refractive optical element is designed to have a negative refractive power.

In the present invention, the definitions of the Abbe constant νd and partial dispersion ratios θgd and θgF are the same as those commonly known, that is, they are represented as follows using the refractive indices Ng, NF, Nd and NC for the g-line, F-line, d-line and C-line respectively, $$\nu d = (Nd-1)/(NF-NC),$$

$$\theta gd = (Ng-Nd)/(NF-NC),$$

$$\theta gF = (Ng-NF)/(NF-NC).$$

In the present invention, the term "solid material" refers to a material that is solid in the state used in the optical system, but it does not refers to the state in a stage (such as a manufacturing stage) prior to its use in the optical system. For example, even if a material is liquid in its manufacturing stage, a solid material obtained by solidifying it will constitutes what is called a solid material in this invention.

BRIEF DESCRIPTION OF THE DRAWINGS

FIG. 7 is a cross sectional view of an optical system according to numerical embodiment 4.

DETAILED DESCRIPTION OF THE PREFERRED EMBODIMENTS

Figure 1:
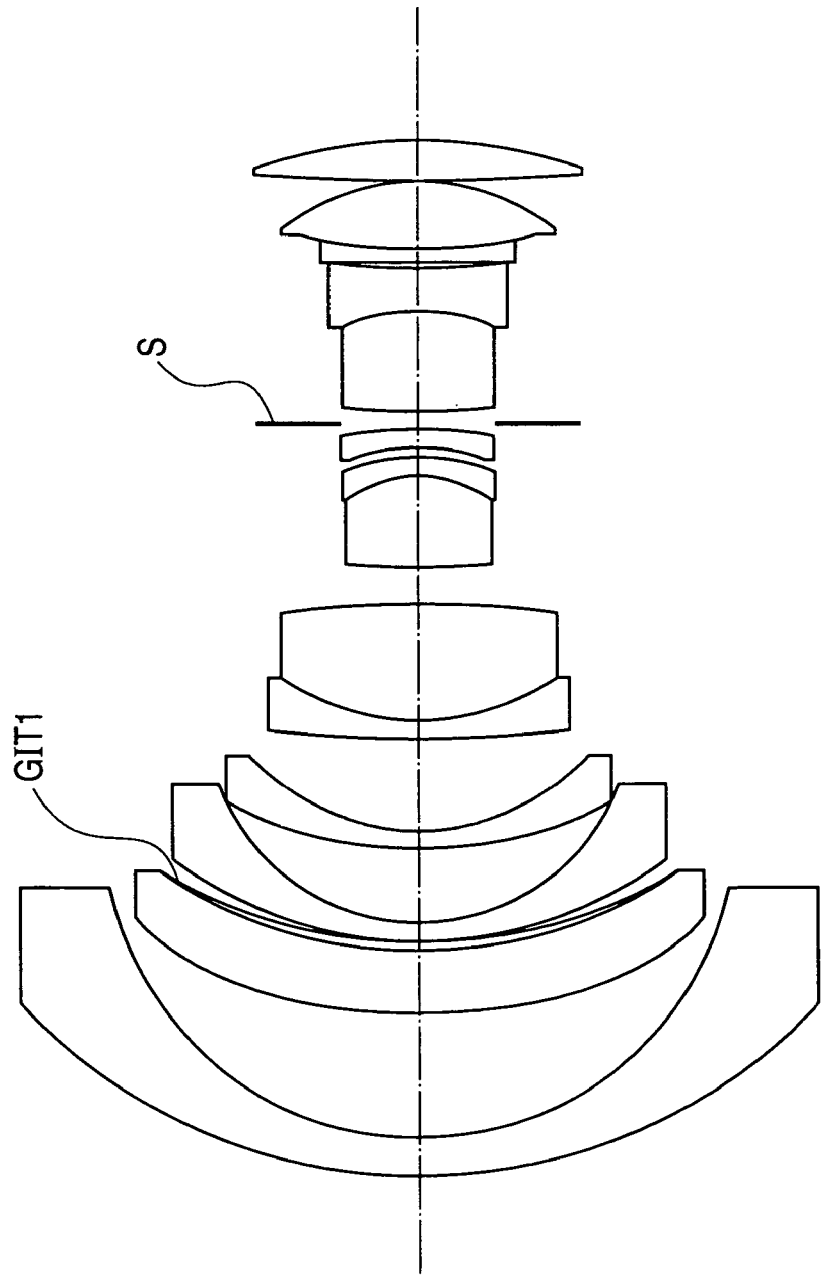
FIG. 1 is a cross sectional view of an optical system according to numerical embodiment 1.

Prior to descriptions of embodiments of the optical system according to the present invention, effects of high dispersion optical materials in correcting aberrations in an optical system will be firstly described.

Let $\Delta\phi$ represent the optical power variation of a refractive lens surface, let ν represent the Abbe constant, let h represent the height, from the optical axis, of the point at which an paraxial marginal ray passes the lens surface, and let H represent the height, from the optical axis, of the point at which a paraxial chief ray passes a lens surface, then the change ΔL in the coefficient of the on-axis chromatic aberration (longitudinal chromatic aberration) and the change ΔT in the coefficient of the chromatic aberration of magnification (lateral chromatic aberration) of this lens surface can be expressed as follows.

$$\Delta L = h^2 \cdot \Delta\phi/\nu \quad (a)$$

$$\Delta T = h \cdot H \cdot \Delta\phi/\nu \quad (b)$$

In connection with this, the paraxial marginal ray is such a paraxial ray that is incident in parallel to the optical axis of the optical system with a height of 1, where the focal length of the whole optical system is normalized to 1. The paraxial chief ray is such a paraxial ray that is incident at an angle of 45° to the optical axis and passes through the intersection of the optical axis and the entrance pupil of the optical system. The incident angle is indicated by a positive value when measured in the clockwise direction from the optical axis, and by a negative value when measured in the anticlockwise direction. Here, it is assumed that the object is present in the left side of the optical system, and rays that enter the optical system from the object side travel from left to right.

As will be apparent from equations (a) and (b), the smaller the absolute value of the Abbe constant is (in other words, the larger the dispersion is), the larger changes in each aberration coefficient relative to changes in the power of the lens surface are. Therefore, when a high dispersion material with a small Abbe constant in absolute value is used, the change in the optical power for achieving required chromatic aberration can be made small. This means, from the standpoint of aberration theory, that chromatic aberration can be controlled without greatly affecting spherical aberration, coma, astigmatism etc. and independency of chromatic aberration correction is enhanced. In contrast, when a low dispersion material is used, the change in the power for obtaining required chromatic aberration becomes large, which involves significant changes in various aberrations such as spherical aberration. Thus, independency of chromatic aberration correction is degraded. In view of the above, it is important, from the standpoint of aberration correction, that at least one lens surface in the lenses constituting the optical system be a refractive lens surface formed by a high dispersion material.

Next, on the basis that the refractive lens is made of high dispersion material, effects of the optical material with a low partial dispersion ratio in correcting aberrations in an optical system will be described.

Concerning wavelength dependency characteristics (i.e. dispersion characteristics) of the refractive index of optical materials, it is well known that the Abbe constant represents the gradient of the dispersion characteristics curve as a whole and the partial dispersion ratio represents the curvature of the dispersion characteristics curve.

In optical materials in general, the refractive index is greater in the short wavelength range than in the long wavelength range (the Abbe constant is a positive value), the dispersion characteristics curve is convex downward (the partial dispersion ratio is a positive value), and changes in the refractive index relative to changes in the wavelength become larger as the wavelength decreases. In addition, the smaller the Abbe constant of an optical material is, the larger its partial dispersion ratio is, and the acuter the downwardly convex curve of the dispersion characteristics tends to be.

The wavelength dependency characteristic curve of the chromatic aberration coefficient of a surface of a lens made of an optical material with a large partial dispersion ratio shows a stronger curve in the short wavelength range than in the case in which an optical material with a small partial dispersion ratio is used. When the optical power of the lens is changed in order to control chromatic aberration, the overall inclination of the wavelength dependency characteristic curve of the chromatic aberration coefficient changes with a rotation center at the position of the design standard wavelength. In connection with this, changes in the short wavelength range, in particular, are large in the case of materials with large partial dispersion ratios than in the case of materials with small partial dispersion ratios, and the overall inclination will vary while involving significant changes in the curvature. For this reason, it is difficult to configure the optical system to achieve cancellation in both the overall inclination and the curvature in the wavelength dependency characteristic curve of the chromatic aberration coefficient, even if glass materials in other diffractive system portions are changed. Therefore, chromatic aberration cannot be corrected all over the wavelength range.

This fact will be specifically described taking chromatic aberration correction (achromatism) in an optical system composed of a refractive optical system portion GIT using a high dispersion material and the other refractive optical system portion G as an example.

In achromatism using high dispersion optical materials, relatively large chromatic aberration coefficients of the portion GIT and the portion G are adapted to cancel each other to produce chromatic aberration of the whole system. To this end, starting from the state in which the chromatic aberration of the portion G as a partial system is corrected to some extent, material for the a positive lens is set to a material having relatively high dispersion, and material for a negative lens is set to a material having relatively low dispersion. Then, the overall inclination of the wavelength dependency characteristic curve of chromatic aberration coefficient of the portion G changes with its linearity being improved as compared to the prior state.

In this state, an appropriate optical power is assigned to the portion GIT to cancel the overall inclination of the wavelength dependency characteristic curve of the chromatic aberration coefficient of the portion G. However, if the portion GIT is made of an optical material with a large partial dispersion ratio, the wavelength dependency characteristic curve of the aberration coefficient of the portion GIT has a curvature opposite to and larger than that of the portion G. Accordingly, it is not possible to cancel the curvature component even if the overall inclination component can be cancelled.

In contrast, if the portion GIT is made of an optical material with a small partial dispersion ratio, since the wavelength dependency characteristic curve of the chromatic aberration coefficient of the portion GIT is relatively linear, it is possible to change its inclination about the rotation center at the position of the design wavelength while maintaining its relative linearity. Therefore, it is possible, relatively easily, to cancel both the inclination component and the curvature component of the wavelength dependency characteristic of the chromatic aberration.

To sum up, it is important that the portion GIT be made of a material having a small partial dispersion ratio in addition to high dispersion. The following conditions (1), (2) and (3) specified by the present invention define the relationship between the Abbe constant and partial dispersion ratios with which chromatic aberration can be excellently corrected based on the principle described in the foregoing.

$$\nu d < 30 \tag{1}$$

$$\theta gd < -3.333 \times 10^{-3} \cdot \nu d + 1.40 \tag{2}$$

$$\theta gF < -2.615 \times 10^{-3} \cdot \nu d + 0.67 \tag{3}$$

Here, $\nu d$ is the Abbe constant of the refractive optical system portion (i.e. lens or layer) GIT, which is represented by the following equation using the refractive indices Nd, NF and NC for the d-line, F-line and C-line respectively.

$$\nu d = (Nd-1)/(NF-NC)$$

In addition, $\theta gd$ and $\theta gF$ are the partial dispersion ratios of the refractive optical system portion (lens or layer) GIT, which are represented by the following equations respectively, using the refractive indices Ng, NF, Nd and NC the g-line, F-line, d-line and C-line respectively.

$$\theta gd = (Ng-Nd)/(NF-NC)$$

$$\theta gF = (Ng-NF)/(NF-NC)$$

Values that do not satisfy any of the above conditions (1) to (3) are not desirable, since it is difficult to achieve good chromatic aberration with such values.

The following modification to the numerical range of condition (1) will further enhance effects of independent chromatic aberration correction to realize improved optical performance.

$$\nu d < 20 \tag{1a}$$

The following condition is more preferable.

$$\nu d < 18 \tag{1b}$$

The following condition is still more preferable.

$$\nu d < 16 \tag{1c}$$

The following condition is still more preferable.

$$\nu d < 14 \tag{1d}$$

The following modifications to the numerical range of conditions (2) and (3), under the assumption that condition (1), (1a), (1b), (1c) or (1d) is satisfied, can realize more excellent optical performance.

$$\theta gd < -3.333 \times 10^{-3} \cdot \nu d + 1.30 \tag{2a}$$

$$\theta gF < -2.615 \times 10^{-3} \cdot \nu d + 0.59 \tag{3a}$$

The following modifications are more preferable.

$$\theta gd < -3.333 \times 10^{-3} \cdot \nu d + 1.25 \tag{2b}$$

$$\theta gF < -2.615 \times 10^{-3} \cdot \nu d + 0.56 \tag{3b}$$

The following modifications are still more preferable.

$$\theta gd < -3.333 \times 10^{-3} \cdot \nu d + 1.2375 \tag{2c}$$

$$\theta gF < -2.615 \times 10^{-3} \cdot \nu d + 0.55 \tag{3c}$$

The following modifications are still more preferable.

$$\theta gd < 1.1137 \tag{2d}$$

$$\theta gF < 0.47 \tag{3d}$$

An example of the optical material that satisfies the above mentioned conditions (1) to (3) is a mixture formed by dispersing inorganic oxide (selected from those listed below) fine particles in a synthetic resin. The inorganic oxide may be $TiO_2$ (nd=2.2652, $\nu d$=11.8), $Nb_2O_5$ (nd=2.367, vd=14.0), ITO (nd=1.8581, vd=5.53), $Cr_2O_3$ (nd=2.2178, vd=13.4), or $BaTiO_3$ (nd=,2.4362 vd=11.3) etc.

Figure 13A:
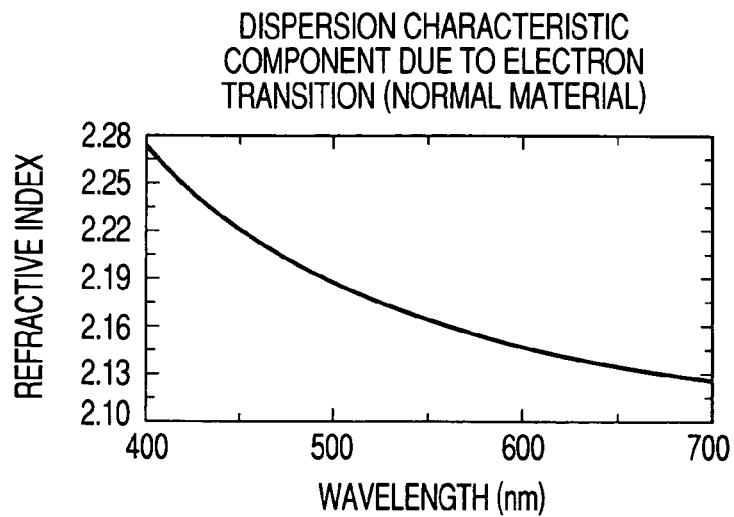
FIGS. 13A, 13B and 13C are graphs schematically illustrating dispersion characteristics of ITO.
Figure 13B:
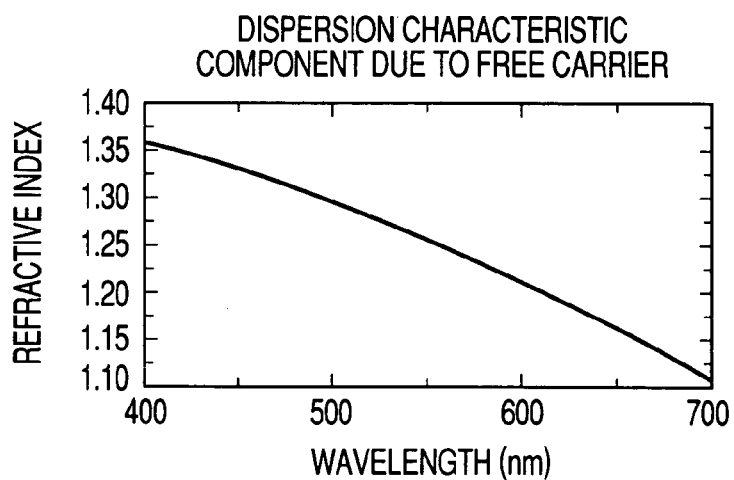
Figure 13C:
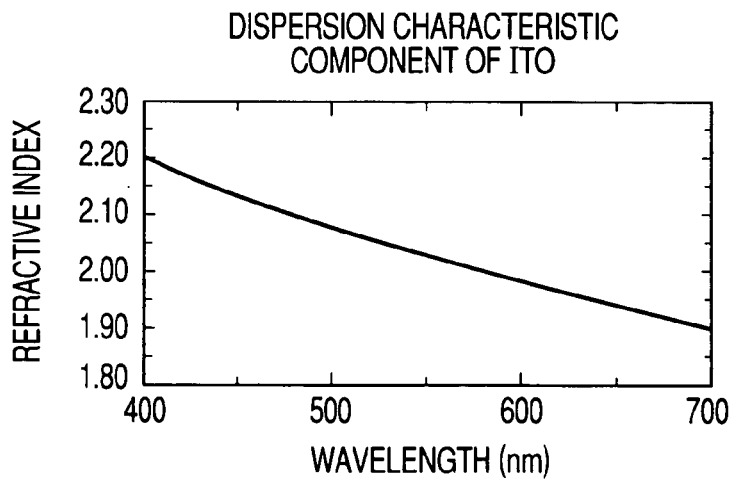

ITO (indium-tin oxide) is especially preferable for its small Abbe constant as compared to the other materials. In ITO, free carriers of conductivity have an influence on the refractive index, unlike with the other materials. The dispersion characteristics of ITO (shown in FIG. 13C) are determined by a combination of changes in the refractive index in the short wavelength range due to ordinary electron transition (shown in FIG. 13A) and refractive index dispersion in the infrared range caused by free carriers. Thus, it shows wavelength dependency of dispersion characteristics having an extraordinary large gradient with an Abbe constant of 5.53.

The refractive index dispersion due to electron transition (FIG. 13A) steeply changes in the short wavelength side of the visible light range. In contrast, the refractive index dispersion due to free carriers (FIG. 13B) steeply changes in the long wavelength side of the visible light range. The combination of these effects makes the partial dispersion ratio small as compared to ordinary cases.

In connection with this, transparent materials expected to be influenced by free carriers include $SnO_2$, ATO ($SnO_2$ doped with antimony) and ZnO.

ITO is known as a material used for making a transparent electrode, ant is commonly used in a liquid crystal display device or an EL (electroluminescent) device etc. Furthermore, ITO is also used in an infrared shielding element and an ultraviolet shielding element. The thickness of ITO in conventionally known applications is limited within the range of 50 to 500 nm, and it has by no means been used as fine particle mixture for correcting chromatic aberration of optical systems.

It is preferred that the mean diameter of the ITO fine particles be approximately 2 nm to 50 nm, in view of influences of dispersion. Dispersing agent or the like may be added to prevent aggregation.

The medium for dispersing ITO may preferably be a monomer, which can be formed with high mass productivity by means of photo-induced polymerization or thermal polymerization using a mold.

From the view point of optical constant characteristics of the monomer, a monomer with a relatively small Abbe constant, a monomer with a relatively small partial dispersion ratio or a monomer with both a small Abbe constant and a small partial dispersion ratio is preferable. N-polyvinylcarbazole, styrene, and polymethyl methacrylate (acrylic) are examples of such a monomer. In the embodiments to be described later, acrylic is used as the medium for dispersing the ITO fine particles, but the medium to be used is not limited to this.

The dispersion characteristic N(X) of the mixture in which nano file particles are dispersed can be easily calculated using the following equation that has been derived from the well known Drude equation.

$$N(\lambda) = [1 + V\{N_{ITO}^2(\lambda) - 1\} + (1 - V)\{N_p^2(\lambda) - 1\}]^{1/2} \quad (c)$$

In the above equation, $\lambda$ is the wavelength, $N_{ITO}$ is the refractive index of the particulate material such as ITO, $N_p$ is the refractive index of the polymer, V is the percentage of the sum of the volume of the fine particles relative to the volume of the polymer.

In this embodiment, it is proposed that a material that satisfies conditions (1) to (3) be used for a lens or a layer formed on a lens surface in an optical system. In addition, by designing the refractive surface formed by this material as an aspherical surface, it is possible to correct chromatic aberration flare such as chromatic spherical aberration. Furthermore, it is preferred that an interface is formed between this material and the ambient atmosphere such as air or a material with a relatively low refractive index, since in that case chromatic aberration can be changed relatively greatly with a slight variation in the curvature of the interface.

In the foregoing, the description has been made of conditions that the optical material constituting the refractive optical system portion GIT is required to satisfy.

Next, conditions for the refractive optical system portion GIT that are required for correcting chromatic aberration of a retrofocus type optical system will be described in the following.

Figure 14:
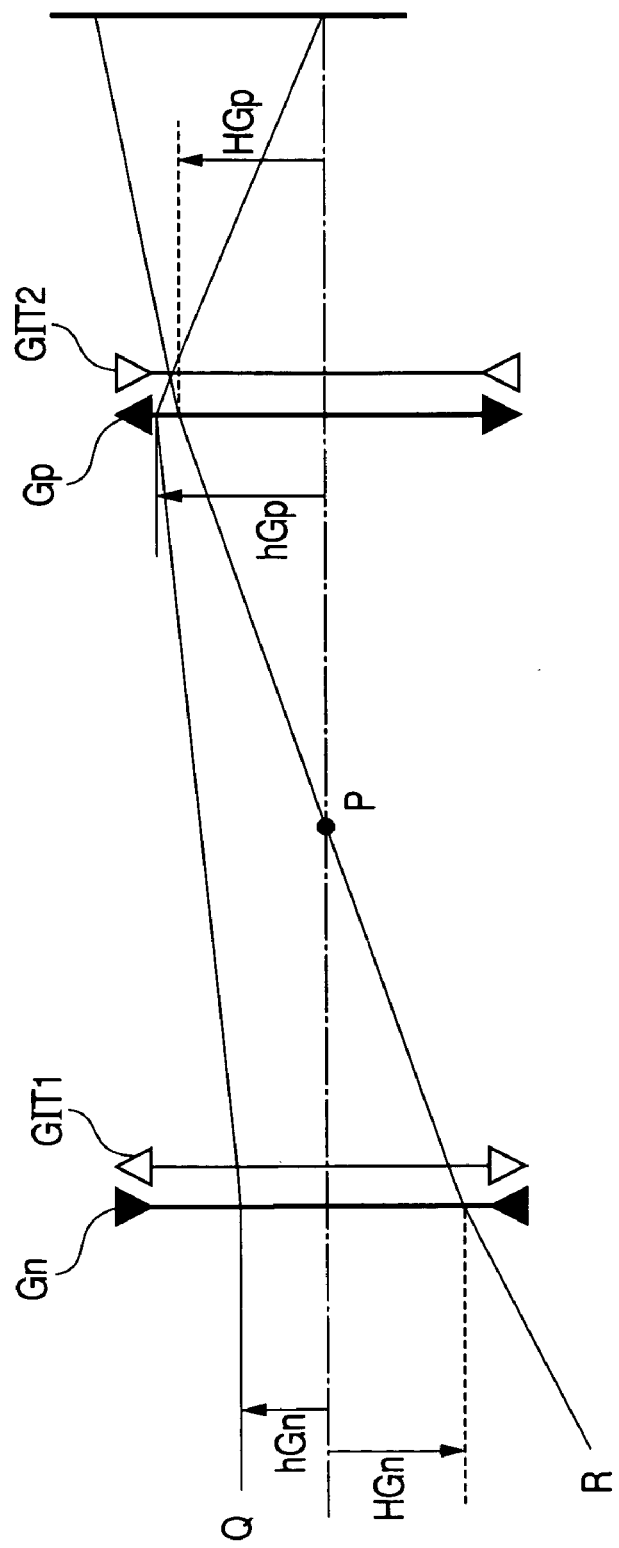
FIG. 14 is a diagram showing a paraxial configuration of a retrofocus type optical system.

FIG. 14 is a schematic diagram showing a paraxial refractive power arrangement for illustrating effects of chromatic aberration correction in a retrofocus type optical system. In FIG. 14, reference signs Gn and Gp designate a front unit having a negative refractive power and a rear unit having a positive refractive power that constitute the retrofocus type optical system respectively. Reference signs GIT1 and GIT2 designate refractive optical system portions GIT (which will be simply referred to as components, hereinafter) included in the front unit Gn and the rear unit Gp respectively. For the sake of simplicity, we assume that all of the lenses constituting the front unit Gn and the rear unit Gp are thin single lenses and arranged on the optical axis with no gaps therebetween respectively in the front unit Gn and the rear unit Gp. We also assume that the component GIT1 and the component GIT2 are thin single lenses and respectively arranged on the optical axis with no intervals from the front unit Gn and the rear unit Gp respectively. What is designated by reference character Q is a paraxial marginal ray, and what is designated by reference character R is a paraxial chief ray. P is the intersection of the paraxial chief ray and the optical axis, which point coincides with the center of the aperture stop in ordinary cases.

Firstly, we consider an optical system in which the component GIT has not been introduced. The equations expressing the aberration coefficient of on-axis chromatic aberration (L) and the aberration coefficient of chromatic aberration of magnification (T) for the front unit Gn and the rear unit Gp are as follows:

$$L(\lambda) = h_{Gn}^2(\lambda_0) \sum_{i=1}^{L} \phi_{Gni}(\lambda_0)/\nu_{Gni}(\lambda) + \quad (d)$$

$$h_{Gp}^2(\lambda_0) \sum_{j=1}^{M} \phi_{Gpj}(\lambda_0)/\nu_{Gpj}(\lambda),$$

$$T(\lambda) = h_{Gn}(\lambda_0)H_{Gn}(\lambda_0) \sum_{i=1}^{L} \phi_{Gni}(\lambda_0)/\nu_{Gni}(\lambda) + \quad (e)$$

$$h_{Gp}(\lambda_0)H_{Gp}(\lambda_0) \sum_{j=1}^{M} \phi_{Gpj}(\lambda_0)/\nu_{Gpj}(\lambda),$$

where, $\nu_{Gni}(\lambda) = \{N_{Gni}(\lambda_0)-1\}/\{N_{Gni}(\lambda)-N_{Gni}(\lambda_0)\} \nu_{Gpj}(\lambda) = \{N_{Gpj}(\lambda_0)-1\}/\{N_{GPj}(\lambda)-N_{GPj}(\lambda_0)\},$ $\phi\phi_{Gni}$: refractive power (optical power) of each thin single lens constituting the front lens unit Gn, $\phi_{Gpj}$: refractive power (optical power) of each thin single lens constituting the rear lens unit Gp, $\nu_{Gni}$: Abbe constant of each thin single lens constituting the front lens unit Gn, $\nu_{Gpj}$: Abbe constant of each thin single lens constituting the rear lens unit Gp, $h_{Gn}$: height of paraxial marginal ray incident on the front lens unit Gn, $h_{Gp}$: height of paraxial marginal ray incident on the rear lens unit Gp, $H_{Gn}$: height of paraxial chief ray incident on the front unit Gn, $H_{Gp}$: height of paraxial chief ray incident on the rear unit Gp, $N_{Gpi}$: refractive index of each thin single lens constituting the rear unit Gp $N_{Gnj}$: refractive index of each thin single lens constituting the front unit Gn, $\lambda$: wavelength, $\lambda_0$: design wavelength.

In order to correct chromatic aberration of magnification more effectively using a material that satisfies conditions (1) to (3), it is preferred that the following condition be satisfied:

$$2 < OTL/f < 15 \qquad (4),$$

where OTL is the optical total length of the optical system and f is the focal length thereof. In the case that the optical system is a zoom lens, OTL and f shall refer to the values at the wide-angle end.

Condition (4) means that the optical system is a retrofocus type lens.

Furthermore, it is preferred that the component GIT disposed on the front side of the intersection P satisfy the following condition:

$$0.01 < \phi GIT/\phi < 0.12 \qquad (5)$$

where, $\phi$GIT: refractive power (optical power) of the component GIT for the d-line under the assumption that the two refractive surface of the component GIT are exposed to air, $\phi$: refractive power (optical power) of the whole optical system for the d-line (in the case that the optical system is a zoom lens, refractive power (optical power) at the wide-angle end).

Furthermore, it is preferred that the component GIT disposed on the rear side of the intersection P satisfy the following condition:

$$-0.2 < \phi GIT/\phi < -0.02 \qquad (6)$$

Condition (5) is a condition for limiting the refractive power of the component GIT relative to the refractive power of the whole system in the case that the component GIT is disposed on the front side of the intersection P. When the positive refractive power of the component GIT is so weak as to be lower than the lower limit value of condition (5), chromatic aberration correction effects will be insufficient. On the other hand, when the positive refractive power of the component GIT is so strong as to be higher than the upper limit value of condition (5), the balance of the chromatic aberration generated by ordinary glass materials and the chromatic aberration generated by the component GIT will be deteriorated to make chromatic aberration worse.

Condition (6) is a condition for limiting the refractive power of the component GIT relative to the refractive power of the whole system in the case that the component GIT is disposed on the rear side of the intersection P. When the negative refractive power of the component GIT is so strong as to be lower than the lower limit value of condition (6), the balance of the chromatic aberration generated by ordinary glass materials and the chromatic aberration generated by the component GIT will be deteriorated to make chromatic aberration worse. On the other hand, the negative refractive power of the component GIT is so weak as to be higher than the upper limit value of condition (6), chromatic aberration correction effects become insufficient.

Next, embodiments in which materials satisfying conditions (1) to (3) are employed in actual optical systems will be described in the following. Here, materials in which ITO fine particles are dispersed as mentioned above are used as materials that satisfy conditions (1) to (3).

Figure 2:
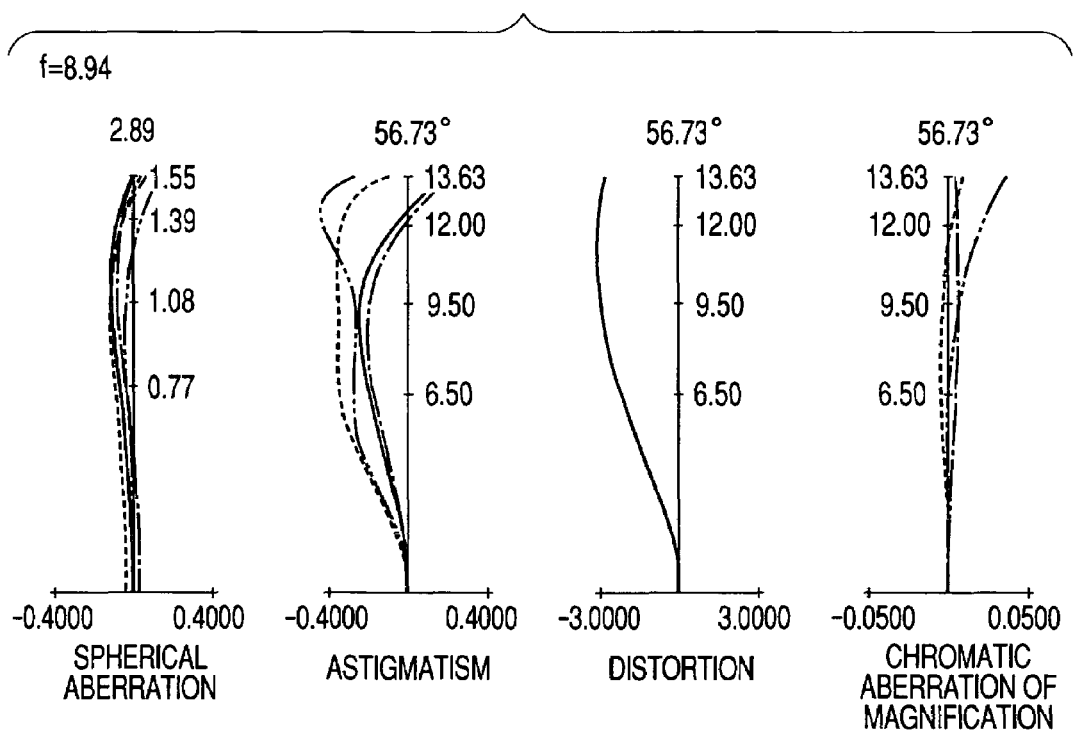
FIG. 2 shows aberration diagrams for the optical system according to numerical embodiment 1

FIG. 1 is a cross sectional view of an optical system according to numerical embodiment 1, in which a lens (or layer) made of a mixture containing ITO fine particles is employed in a retrofocus type optical system with a focal length of 9 mm. In this example, a resin material for replicas in which ITO fine particles are mixed at a proportion of 20% is used. In FIG. 1, reference sign GIT1 designates the lens (layer) including ITO, and reference sign S designates an aperture stop. FIG. 2 shows aberration diagrams of the optical system according to numerical embodiment 1 in the state in which the optical system is focused at infinity. In FIG. 1, the left side is the object side (front side), while the right side is the image side (rear side). This orientation also applies to numerical embodiments 2 to 4.

In the optical system of numerical embodiment 1, the lens (layer) made of the mixture containing ITO fine particles is employed in the object side portion, in which the height, from the optical axis, of the path of the paraxial chief ray is relatively high. In addition, the lens (layer) GIT1 made of the mixture containing ITO fine particles is designed to have a positive refractive power to mainly correct chromatic aberration of magnification, so that a retrofocus type optical system in which chromatic aberration of magnification is excellently corrected is realized.

Figure 3:
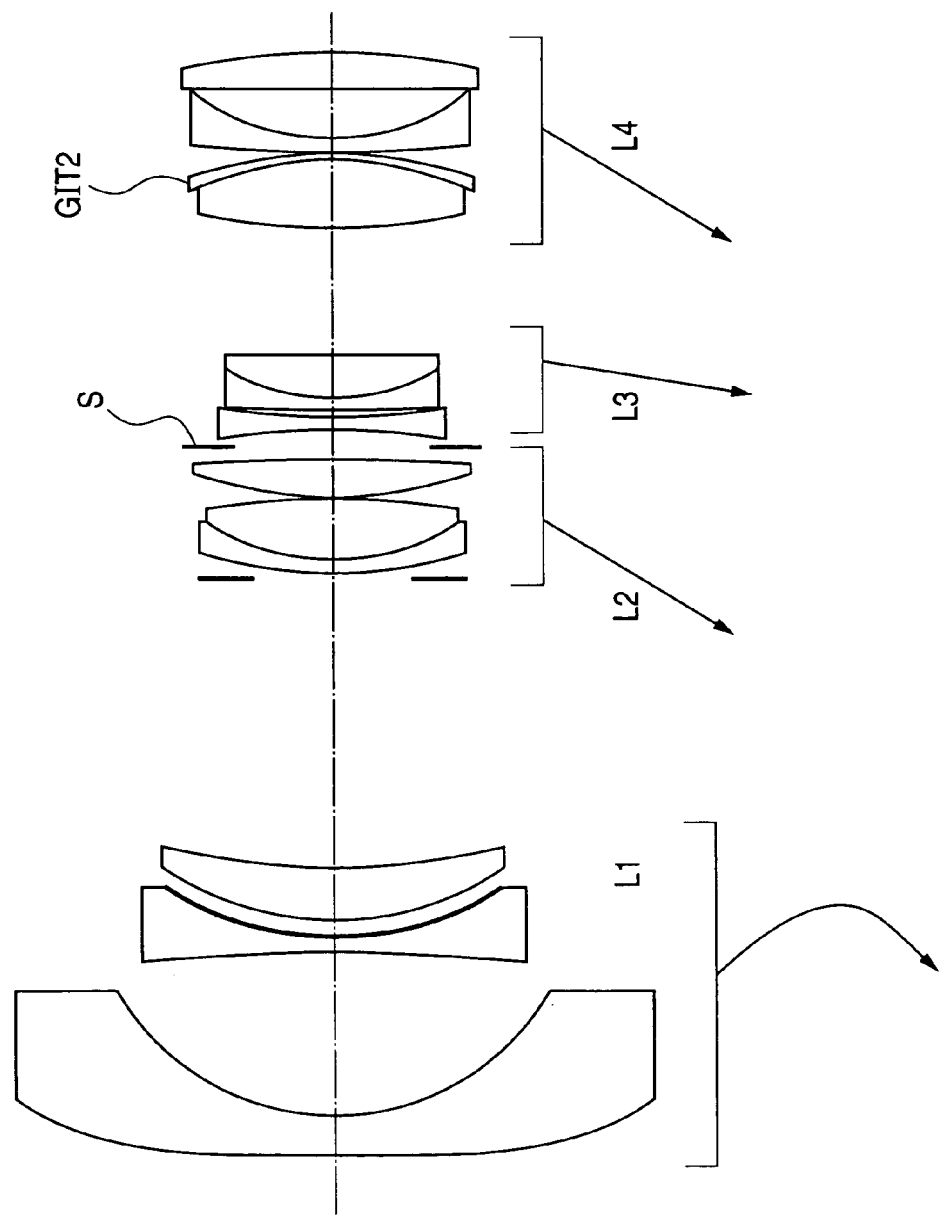
FIG. 3 is a cross sectional view of an optical system according to numerical embodiment 2.
Figure 4A:
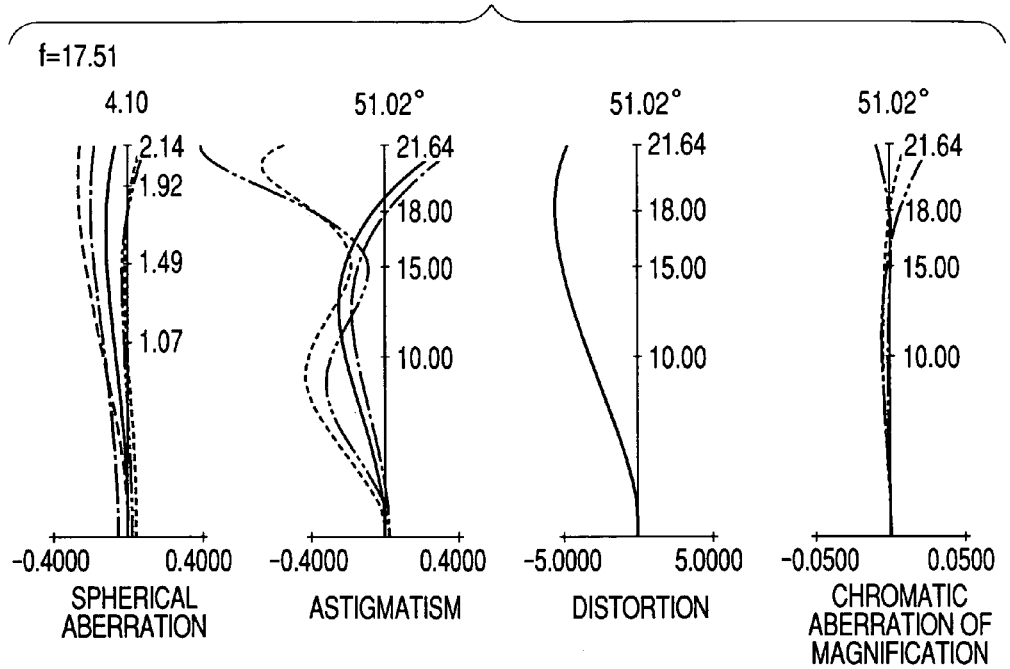
FIGS. 4A and 4B show aberration diagrams for the optical system according to numerical embodiment 2.
Figure 4B:
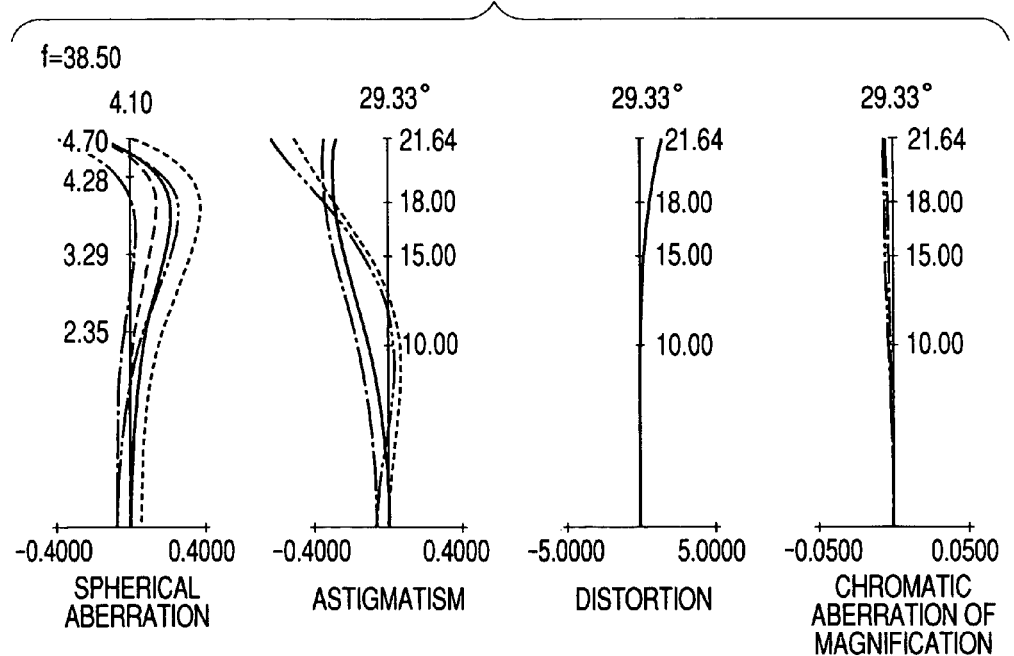

FIG. 3 is a cross sectional view showing an optical system according to numerical embodiment 2, in which a lens (or layer) made of a mixture containing ITO fine particles is employed in a wide angle zoom lens with the focal length range of 17 mm to 40 mm. In this example, acrylic in which ITO fine particles are mixed at a proportion of 20% is used. In FIG. 3, reference sign GIT2 designates the lens (layer) made of the mixture containing ITO fine particles, reference sign S designates an aperture stop, reference sign L1 designates the first lens unit having a negative refractive power, reference sign L2 designates the second lens unit having a positive refractive power, reference sign L3 designates the third lens unit having a negative refractive power, and reference sign L4 designates the fourth lens unit having a positive refractive power. Upon zooming from the wide-angle end to the telephoto end, the lens units are adapted to move following the loci represented by the arrows in FIG. 3. FIG. 4A shows aberration diagrams of the optical system according to numerical embodiment 2 at the wide-angle end in the state in which the optical system is focused at infinity. FIG. 4B shows aberration diagrams at the telephoto end in the state in which the optical system is focused at infinity.

In the optical system of numerical embodiment 2, the lens (layer) made of the mixture containing ITO fine particles is employed on the image side of the aperture stop S, in which the height, from the optical axis, of the path of the paraxial chief ray is relatively high. In addition, the lens (layer) GIT2 made of the mixture containing ITO fine particles is designed to have a negative refractive power to intensively correct chromatic aberration of magnification, so that a retrofocus type optical system in which chromatic aberration of magnification is excellently corrected is realized.

Figure 5:
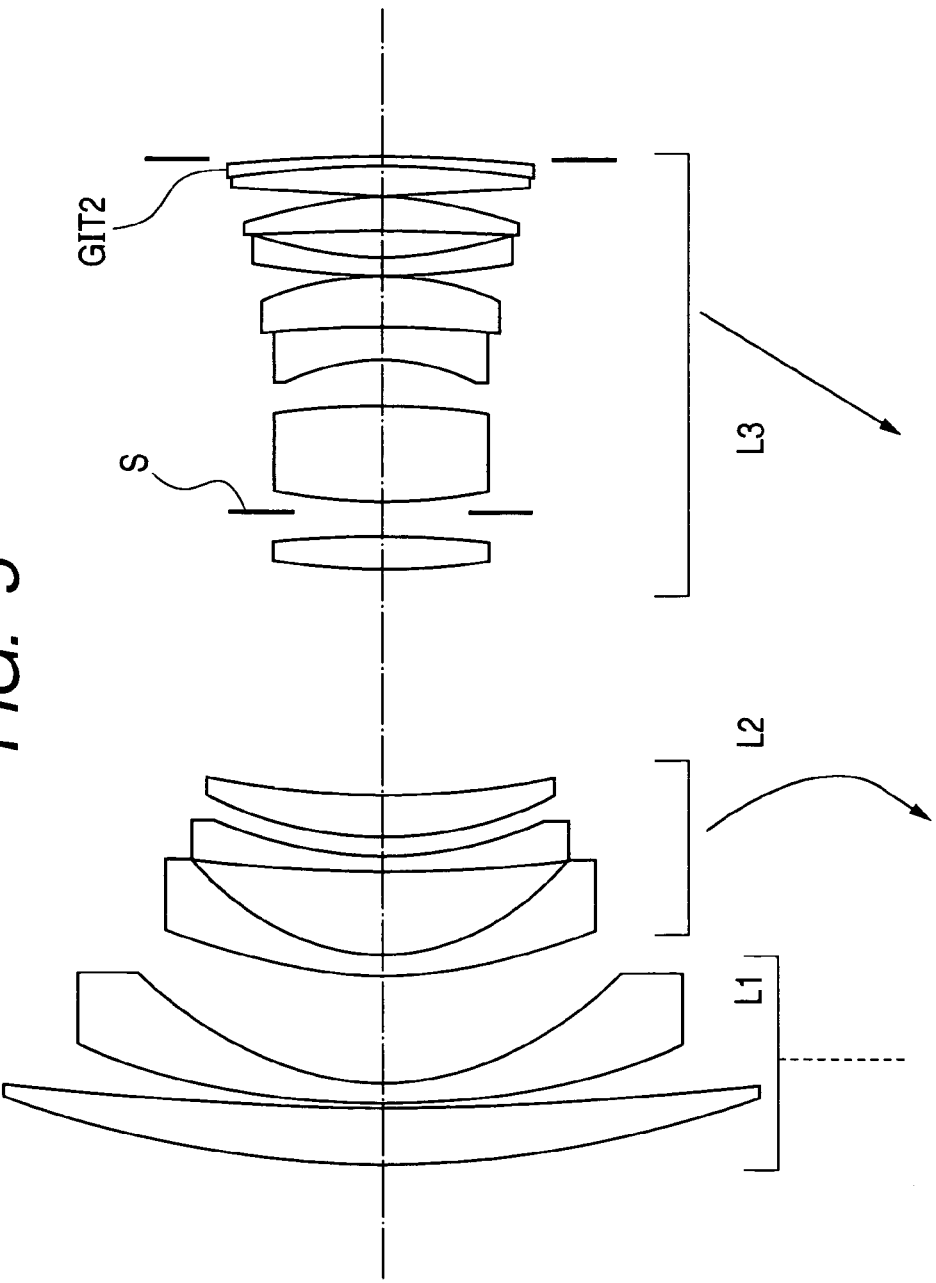
FIG. 5 is a cross sectional view of an optical system according to numerical embodiment 3.
Figure 6A:
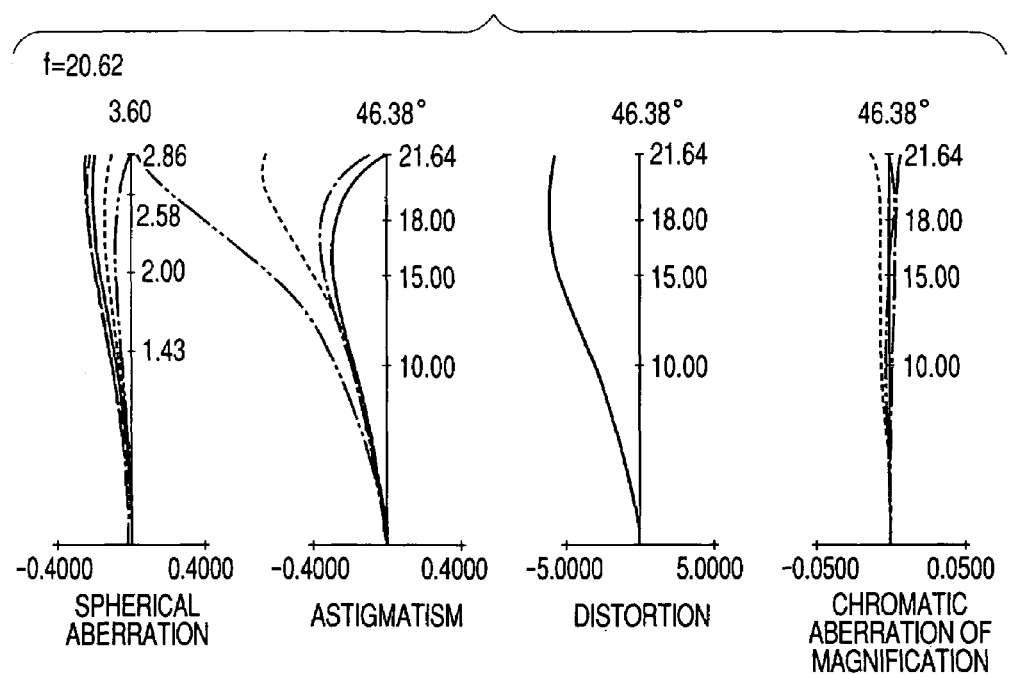
FIGS. 6A and 6B show aberration diagrams for the optical system according to numerical embodiment 3.
Figure 6B:
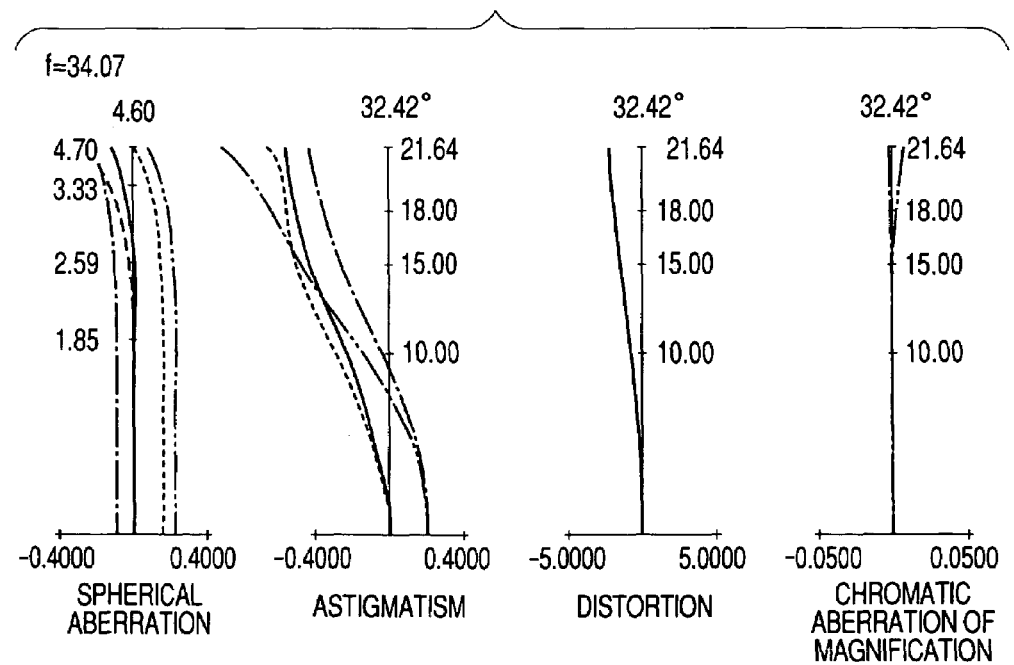

FIG. 5 is a cross sectional view showing an optical system according to numerical embodiment 3, in which a lens (or layer) made of a mixture containing ITO fine particles is employed in a wide angle zoom lens with the focal length range of 20 mm to 35 mm. In this example, a resin material for replicas in which ITO fine particles are mixed at a proportion of 20% is used. In FIG. 5, reference sign GIT2 designates the lens (layer) made of the mixture containing ITO fine particles, reference sign S designates an aperture stop, reference sign L1 designates the first lens unit having a negative refractive power, reference sign L2 designates the second lens unit having a negative refractive power, and reference sign L3 designates the third lens unit having a positive refractive power. Upon zooming from the wide angle end to the telephoto end, the lens units are adapted to move following the loci represented by the arrows in FIG. 5. FIG. 6A shows aberration diagrams of the optical system according to numerical embodiment 3 at the wide-angle end in the state in which the optical system is focused at infinity. FIG. 6B shows aberration diagrams at the telephoto end in the state in which the optical system is focused at infinity.

In the optical system of numerical embodiment 3, the lens (layer) made of the mixture containing ITO fine particles is employed on the image side of the aperture stop S, in which the height, from the optical axis, of the path of the paraxial chief ray is relatively high. In addition, the lens (layer) GIT2 made of the mixture containing ITO fine particles is designed to have a negative refractive power to intensively correct chromatic aberration of magnification, so that a retrofocus type optical system in which chromatic aberration of magnification is excellently corrected is realized.

Figure 8A:
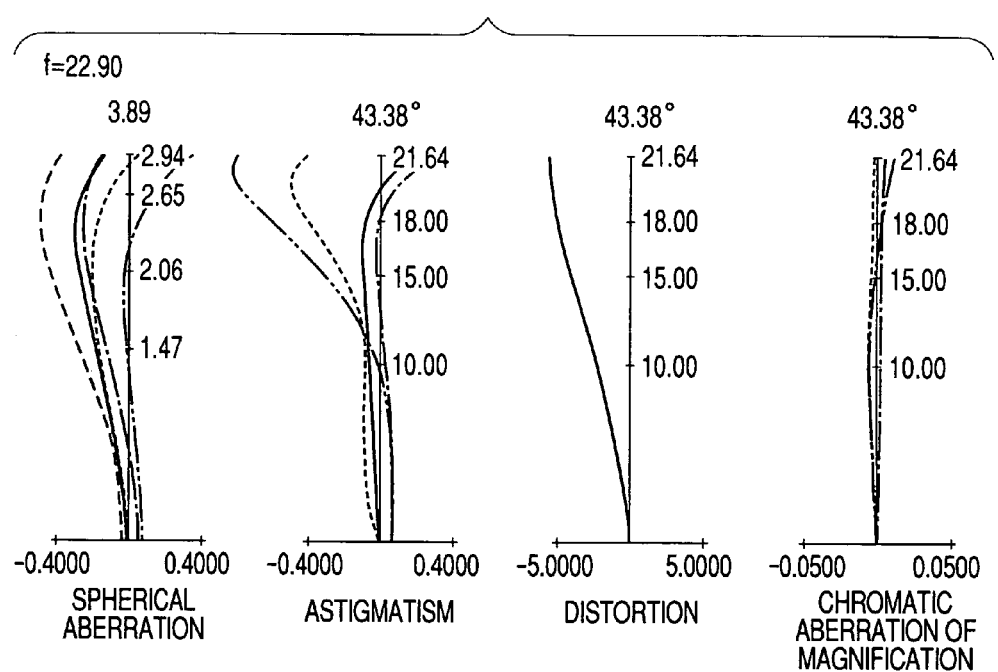
FIGS. 8A and 8B show aberration diagrams for the optical system according to numerical embodiment 4.
Figure 8B:
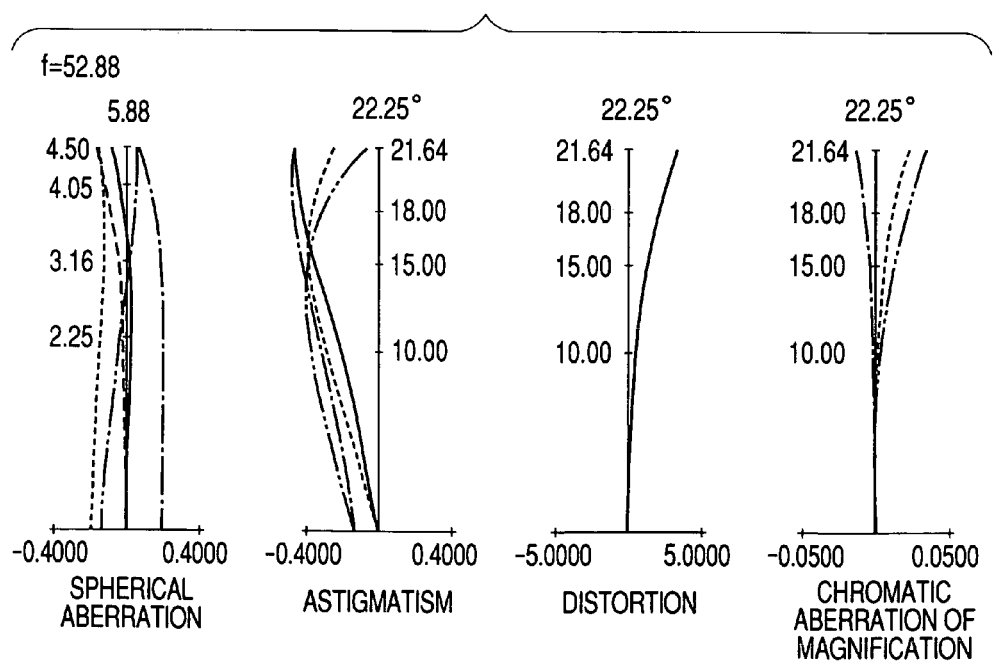

FIG. 7 is a cross sectional view showing an optical system according to numerical embodiment 4, in which a lens (or layer) made of a mixture containing ITO fine particles is employed in a wide angle zoom lens with the focal length range of 22 mm to 55 mm. In this example, a resin material for replicas in which ITO fine particles are mixed at a proportion of 20% is used. In FIG. 7, reference sign GIT1 designates the lens (layer) made of the mixture containing ITO fine particles, reference sign S designates an aperture stop, reference sign L1 designates the first lens unit having a negative refractive power, reference sign L2 designates the second lens unit having a positive refractive power, and reference sign L3 designates the third lens unit having a negative refractive power. Upon zooming from the wide angle end to the telephoto end, the lens units are adapted to move following the loci represented by the arrows in FIG. 7. FIG. 8A shows aberration diagrams of the optical system according to numerical embodiment 4 at the wide-angle end in the state in which the optical system is focused at infinity. FIG. 8B shows aberration diagrams at the telephoto end in the state in which the optical system is focused at infinity.

In the optical system of numerical embodiment 4, the lens (layer) made of the mixture containing ITO fine particles is employed on the object side of the aperture stop S, in which the height, from the optical axis, of the path of the paraxial chief ray is relatively high. In addition, the lens (layer) GIT1 made of the mixture containing ITO fine particles is designed to have a positive refractive power to intensively correct chromatic aberration of magnification, so that a retrofocus type wide-angle optical system in which chromatic aberration of magnification is excellently corrected is realized.

Figure 9:
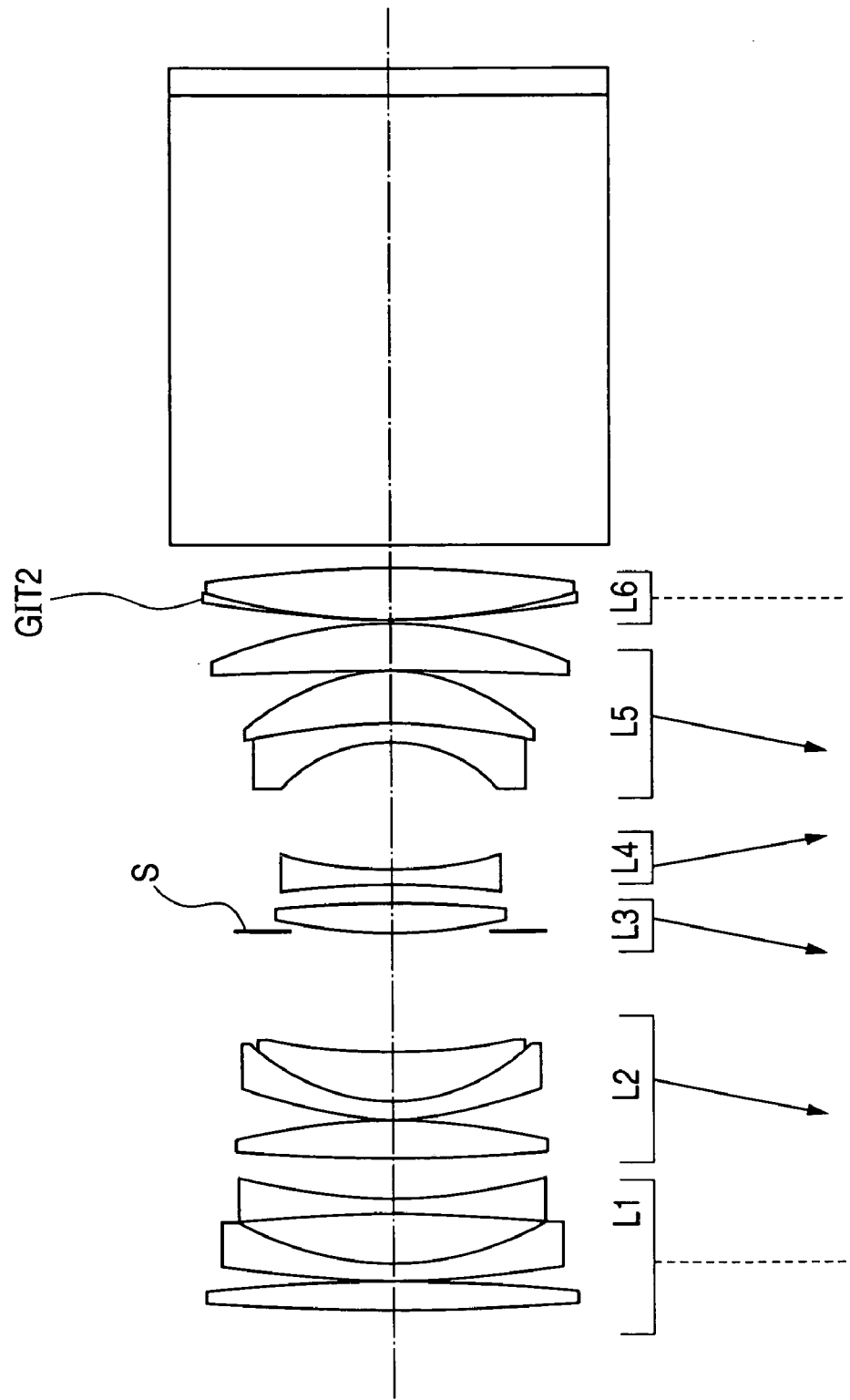
FIG. 9 is a cross sectional view of an optical system according to numerical embodiment 5.

FIG. 9 is a cross sectional view showing an optical system according to numerical embodiment 5 in its wide-angle end state, in which a lens (or layer) made of a mixture containing ITO fine particles is employed in a projection optical system with the focal length range of 28 mm to 35 mm. The optical system of this example is a projection optical system for use in a projector for projecting an original image displayed on a liquid crystal panel onto a screen. In this example, acrylic in which ITO fine particles are mixed at a proportion of 20% is used. In FIG. 9, reference sign GIT2 designates the lens (layer) made of the mixture containing ITO fine particles, reference sign S designates an aperture stop, reference sign L1 designates the first lens unit having a negative refractive power, reference sign L2 designates the second lens unit having a positive refractive power, reference sign L3 designates the third lens unit having a positive refractive power, reference sign L4 designates the fourth lens unit having a negative refractive power, reference sign L5 designates the fifth lens unit having a positive refractive power, and reference sign L6 designates the sixth lens unit having a positive refractive power. Upon zooming from the wide-angle end to the telephoto end, the lens units are adapted to move following the loci represented by the arrows in FIG. 9. In FIG. 9, the left side is the screen side (front side), while the right side is the original image side (rear side). This orientation also applies to numerical embodiment 6.

Figure 10A:
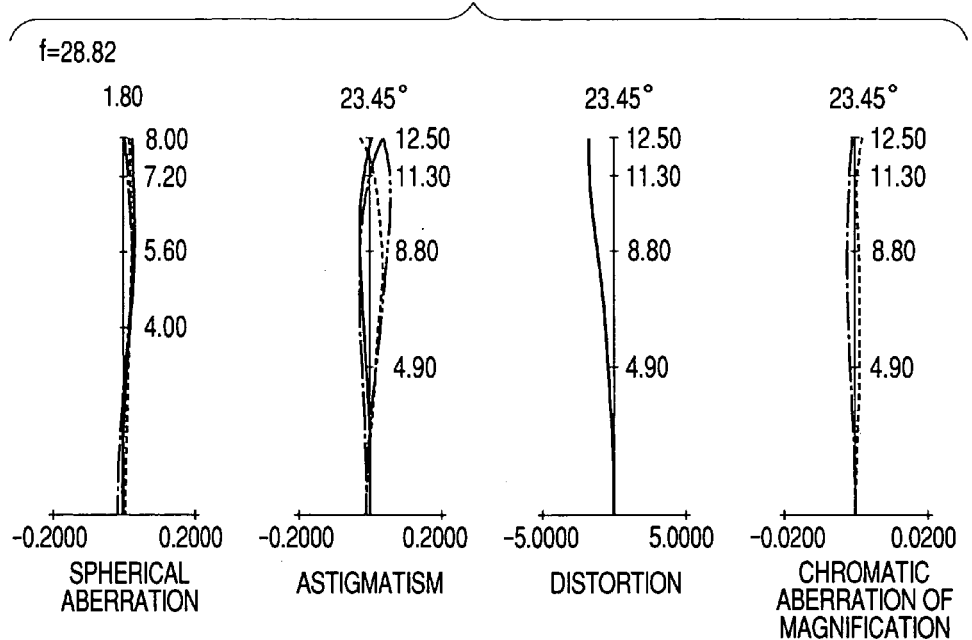
FIGS. 10A and 10B show aberration diagrams for the optical system according to numerical embodiment 5.
Figure 10B:
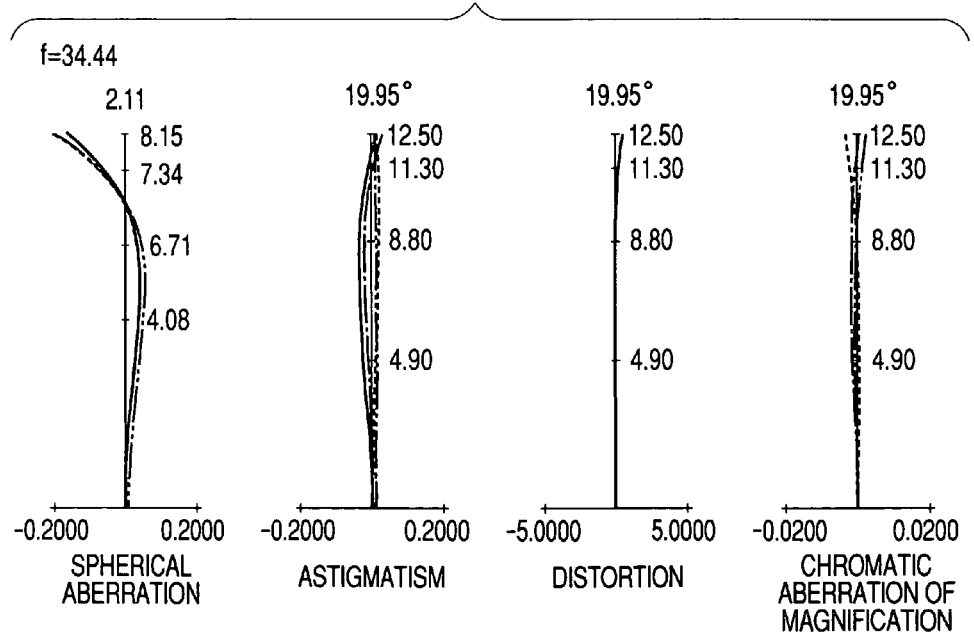

FIG. 10A shows aberration diagrams of the optical system according to numerical embodiment 5 at the wide-angle end (i.e. in the shortest focal length state). FIG. 10B shows aberration diagrams at the telephoto end (i.e. in the longest focal length state).

In the optical system of numerical embodiment 5, the lens (layer) made of the mixture containing ITO fine particles is employed in the original image side of the aperture stop S, in which the height, from the optical axis, of the path of the paraxial chief ray is relatively high. In addition, the lens (layer) GIT2 made of the mixture containing ITO fine particles is designed to have a negative refractive power to intensively correct chromatic aberration of magnification, so that a retrofocus type projection optical system in which chromatic aberration of magnification is excellently corrected is realized.

Figure 11:
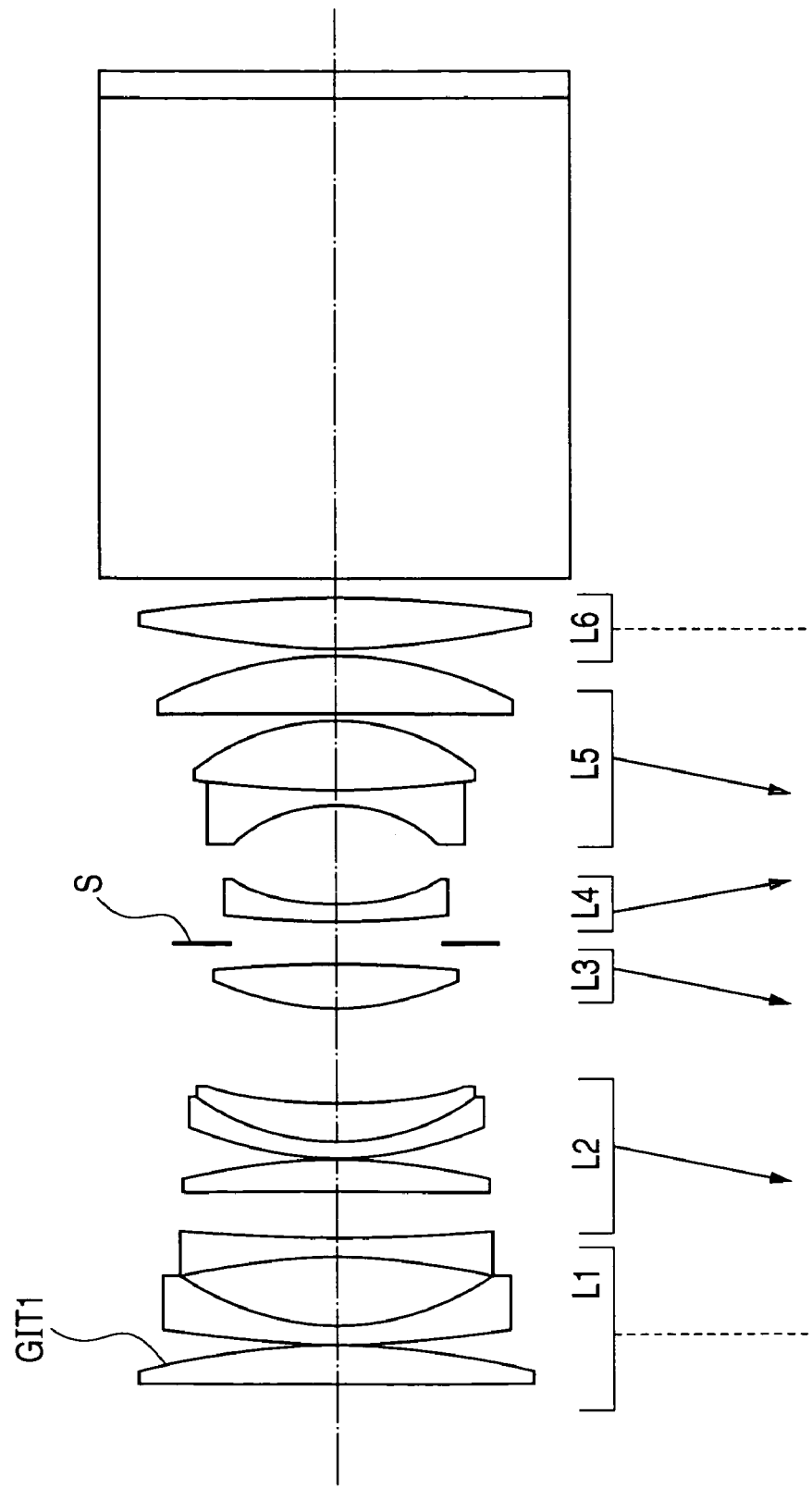
FIG. 11 is a cross sectional view of an optical system according to numerical embodiment 6.
Figure 12A:
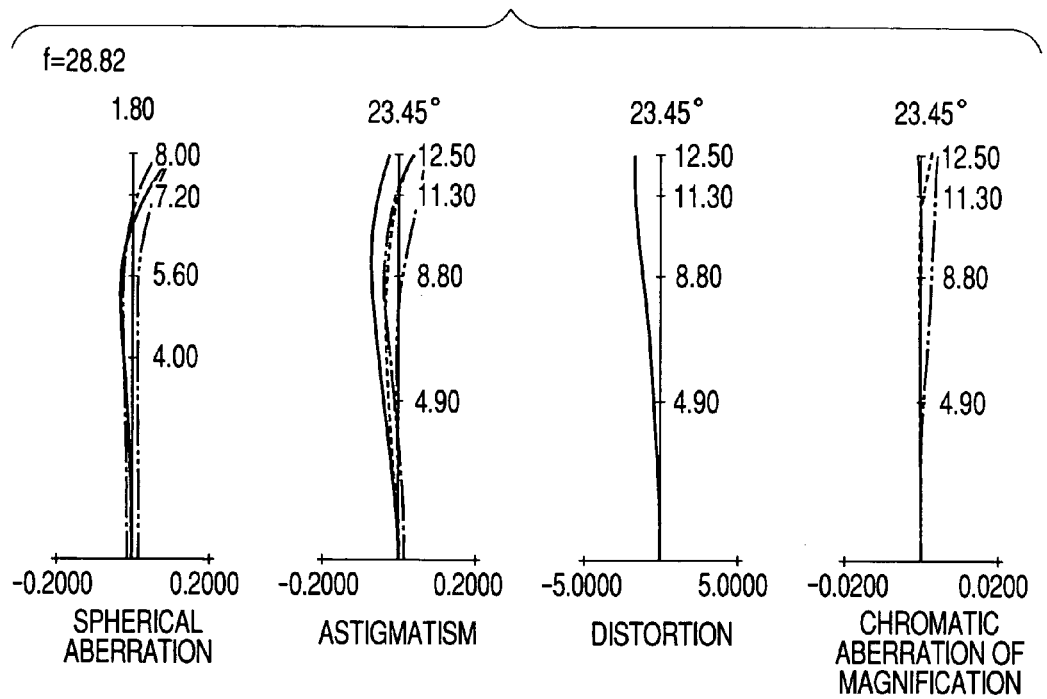
FIGS. 12A and 12B show aberration diagrams for the optical system according to numerical embodiment 5.
Figure 12B:
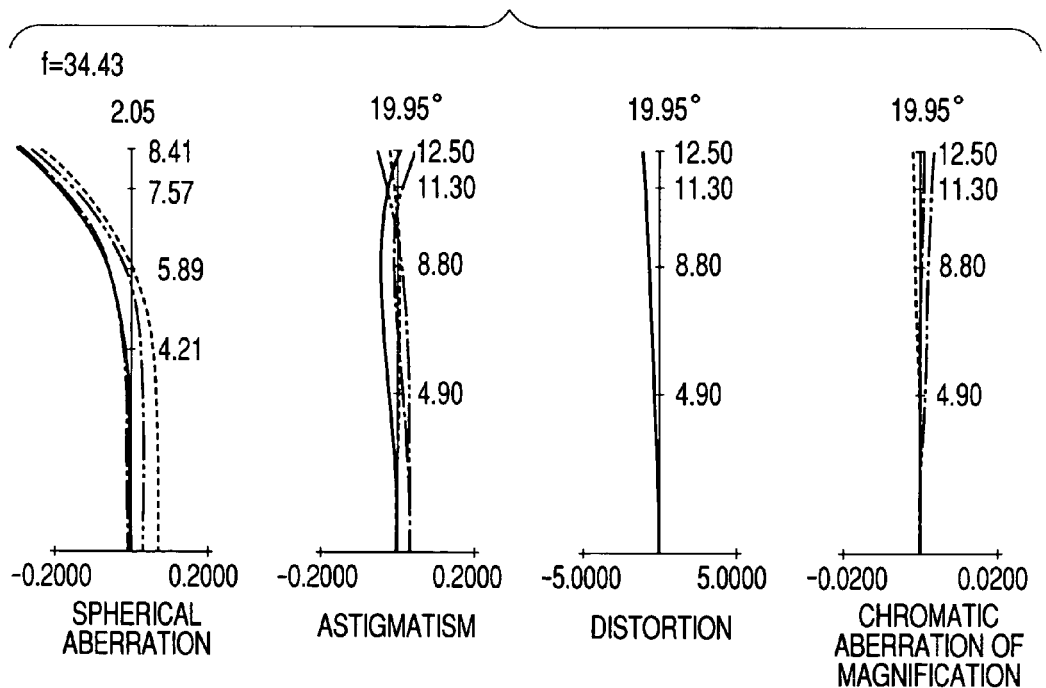

FIG. 11 is a cross sectional view showing an optical system according to numerical embodiment 6 in its wide-angle end state, in which a lens (or layer) made of a mixture containing ITO fine particles is employed in a projection optical system with the focal length range of 28 mm to 35 mm. In this embodiment, acrylic in which ITO fine particles are mixed at a proportion of 20% is used. In FIG. 11 reference sign GIT1 designates the lens (layer) made of the mixture containing ITO fine particles, reference sign S designates an aperture stop, reference sign L1 designates the first lens unit having a negative refractive power, reference sign L2 designates the second lens unit having a positive refractive power, reference sign L3 designates the third lens unit having a positive refractive power, reference sign L4 designates the fourth lens unit having a negative refractive power, reference sign L5 designates the fifth lens unit having a positive refractive power, and reference sign L6 designates the sixth lens unit having a positive refractive power. Upon zooming from the wide-angle end to the telephoto end, the lens units are adapted to move following the loci represented by the arrows in FIG. 11. FIG. 12A shows aberration diagrams of the optical system according to numerical embodiment 6 at the wide-angle end. FIG. 12B shows aberration diagrams at the telephoto end.

In the optical system of numerical embodiment 6, the lens (layer) made of the mixture containing ITO fine particles is employed in the screen side of the aperture stop S, in which the height, from the optical axis, of the path of the paraxial chief ray is relatively high. In addition, the lens (layer) GIT1 made of the mixture containing ITO fine particles is designed to have a positive refractive power to intensively correct chromatic aberration of magnification, so that a retrofocus type projection optical system in which chromatic aberration of magnification is excellently corrected is realized.

Specific numerical data of numerical embodiments 1 to 6 are presented in the following. In the data of each numerical embodiment, the suffix i generally refers to the element number (or surface number) counted from the object side, namely, ri represents the radius of curvature of the i-th optical surface (the i-th surface), di represents the on-axis distance between the i-th surface and the (i+1)-th surface, and ni and vi respectively represent the refractive index for the d-line and the Abbe constant of the i-th optical member. In addition, f represents the focal length, Fno represents the F-number and ω represents the half angle of view.

Furthermore, let x be the shift amount along the optical axis from the vertex, let h be the height measured along the direction perpendicular to the optical axis from the optical axis, let r be the paraxial radius of curvature, let k be the conic constant, and let B, C, D, E . . . be the aspherical coefficients of the respective orders, then the aspherical shape is expressed by the following formula.

$$x(h) = \frac{(1/r)h^2}{1 + \sqrt{\{1 - (1+k)(h/r)^2\}}} + Bh^4 + Ch^6 + Dh^8 + Eh^{10} \ldots$$

Incidentally, in the data of the aspherical coefficients, the expression "e±X" means "×10^{±X}".

In all of the numerical embodiments, ITO is used in the state dispersed in acrylic (PMMA) at a volume fraction of 20%. The refractive index of the mixture of ITO and acrylic is calculated based on the value obtained by calculation using equation (c) mentioned before.

Sign Gi represents the i-th element, and the refractive indices for the d-line, the g-line, the C-line and the F-line, the Abbe constant and the partial dispersion ratios are also presented.

In the spherical aberration diagrams shown in FIGS. 2, 4A, 4B, 6A, 6B, 8A and 8B, the solid lines are for the d-line, the two-dot chain lines are for the g-line, the chain lines are for the C-line and the broken lines are fore the F-line. In the astigmatism diagrams, the solid lines are for the d-line sagittal image plane, the broken lines are for the d-line meridional image plane, the chain lines are for the g-line sagittal image plane, and the two-dot chain lines are for the g-line meridional image plane. The distortion diagrams are presented for the d-line. In the chromatic aberration of magnification diagrams, the two-dot chain lines are for the g-line, the chain lines are for the C-line and the broken lines are for the F-line.

In the spherical aberration diagrams shown in FIGS. 10A, 10B, 12A and 12B, the solid lines are for the wavelength of 550 nm, the two-dot chain lines are for the wavelength of 440 nm, the chain lines are for the wavelength of 620 nm and the broken lines are for the wavelength of 470 nm. In the astigmatism diagrams in FIGS. 10A, 10B, 12A and 12B, the solid lines are for the sagittal image plane at the wavelength of 550 nm, the broken lines are for the meridional image plane at the wavelength of 550 nm, the chain lines are for the sagittal image plane at the wavelength of 440 nm, and the two-dot chain lines are for the meridional image plane at the wavelength of 440 nm. In the distortion diagrams are presented for the wavelength of 550 nm. In the chromatic aberration of magnification diagrams, the two-dot chain lines are for the wavelength of 440 nm, the chain lines are for the wavelength of 470 nm, and the broken lines are for the wavelength of 620 nm.

The values related to conditions (4) to (6) are presented in Table 1 for each of the numerical embodiments.

(Numerical Embodiment 1)
f = 8.9 FNo = 1:2.9 2ω = 113.5°

| | | | |
|---|---|---|---|
| r1 = 28.900 | d1 = 2.00 | n1 = 1.69680 | v1 = 55.5 |
| r2 = 16.733 | d2 = 7.05 | | |
| *r3 = 41.159 | d3 = 3.50 | n2 = 1.60311 | v2 = 60.7 |
| r4 = 24.855 | d4 = 0.50 | n3 = 1.59629 | v3 = 13.9 |
| r5 = 27.428 | d5 = 0.10 | | |
| r6 = 22.550 | d6 = 1.00 | n4 = 1.69680 | v4 = 55.5 |
| r7 = 11.640 | d7 = 4.00 | | |
| r8 = 24.419 | d8 = 0.90 | n5 = 1.77250 | v5 = 49.6 |
| r9 = 12.204 | d9 = 5.20 | | |
| r10 = 92.038 | d10 = 0.95 | n6 = 1.69680 | v6 = 55.5 |
| r11 = 13.058 | d11 = 6.40 | n7 = 1.59551 | v7 = 39.2 |
| r12 = −41.643 | d12 = 2.10 | | |
| r13 = 37.448 | d13 = 5.10 | n8 = 1.57501 | v8 = 41.5 |
| r14 = −6.427 | d14 = 1.00 | n9 = 1.77250 | v9 = 49.6 |
| r15 = −9.282 | d15 = 0.55 | | |
| r16 = −10.232 | d16 = 0.90 | n10 = 1.77250 | v10 = 49.6 |
| r17 = −29.514 | d17 = 0.30 | | |
| r18 = (stop) | d18 = 0.85 | | |
| r19 = 37.309 | d19 = 5.50 | n11 = 1.62299 | v11 = 58.2 |
| r20 = −10.365 | d20 = 2.50 | n12 = 1.74320 | v12 = 49.3 |
| r21 = 33.296 | d21 = 0.43 | | |
| r22 = −141.615 | d22 = 0.50 | n13 = 1.92286 | v13 = 18.9 |
| r23 = 25.888 | d23 = 3.70 | n14 = 1.51728 | v14 = 69.6 |
| r24 = −11.329 | d24 = 0.12 | | |
| r25 = 176.338 | d25 = 2.10 | n15 = 1.81600 | v15 = 46.6 |
| r26 = −26.764 | | | |

| Focal Length | 8.94 |
|---|---|

Aspherical Coefficient
3rd surface

| b: 4.101813e−05 | c: 2.006611e−08 | d: −2.784478e−10 |
|---|---|---|
| e: 1.312873e−12 | | |

Refractive Index at Each Wavelength

| | d | g | c | f | vd | θgd | θgF |
|---|---|---|---|---|---|---|---|
| G1 | 1.69680 | 1.71234 | 1.69297 | 1.70552 | 55.5 | 1.238 | 0.543 |
| G2 | 1.60311 | 1.61539 | 1.60008 | 1.61002 | 60.7 | 1.235 | 0.540 |
| G3(GIT) | 1.59629 | 1.63830 | 1.58040 | 1.62342 | 13.9 | 0.976 | 0.346 |
| G4 | 1.69680 | 1.71234 | 1.69297 | 1.70552 | 55.5 | 1.238 | 0.543 |
| G5 | 1.77250 | 1.79196 | 1.76780 | 1.78337 | 49.6 | 1.250 | 0.552 |
| G6 | 1.69680 | 1.71234 | 1.69297 | 1.70552 | 55.5 | 1.238 | 0.543 |
| G7 | 1.59551 | 1.61498 | 1.59103 | 1.60621 | 39.2 | 1.283 | 0.578 |
| G8 | 1.57501 | 1.59275 | 1.57090 | 1.58476 | 41.5 | 1.280 | 0.576 |
| G9 | 1.77250 | 1.79196 | 1.76780 | 1.78337 | 49.6 | 1.250 | 0.552 |
| G10 | 1.77250 | 1.79197 | 1.76780 | 1.78337 | 49.6 | 1.250 | 0.552 |
| G11 | 1.62299 | 1.63630 | 1.61974 | 1.63045 | 58.2 | 1.243 | 0.546 |
| G12 | 1.74320 | 1.76205 | 1.73865 | 1.75372 | 49.3 | 1.251 | 0.553 |
| G13 | 1.92286 | 1.98972 | 1.90916 | 1.95800 | 18.9 | 1.369 | 0.649 |
| G14 | 1.51728 | 1.52638 | 1.51499 | 1.52242 | 69.6 | 1.225 | 0.533 |
| G15 | 1.81600 | 1.83800 | 1.81075 | 1.82825 | 46.6 | 1.257 | 0.557 |

(Numerical Embodiment 2)
f = 7.5–38.5 Fno = 1:4.1 2ω = 102.0°–58.7°

| | | | |
|---|---|---|---|
| *r1 = 1381.812 | d1 = 3.50 | n1 = 1.58313 | ν1 = 59.4 |
| r2 = 20.079 | d2 = variable | | |
| r3 = −119.765 | d3 = 1.30 | n2 = 1.77250 | ν2 = 49.6 |
| *r4 = 26.434 | d4 = 1.32 | | |
| r5 = 23.868 | d5 = 4.35 | n3 = 1.84666 | ν3 = 23.9 |
| r6 = 50.526 | d6 = variable | | |
| r7 = 0.000 | d7 = 0.50 | | |
| r8 = 36.740 | d8 = 1.20 | n4 = 1.84666 | ν4 = 23.9 |
| r9 = 20.162 | d9 = 4.99 | n5 = 1.51633 | ν5 = 64.1 |
| r10 = −54.769 | d10 = 0.15 | | |
| r11 = 33.954 | d11 = 3.19 | n6 = 1.67790 | ν6 = 55.3 |
| r12 = −122.644 | d12 = variable | | |
| r13 = (stop) | d13 = 1.50 | | |
| r14 = −50.807 | d14 = 1.00 | n7 = 1.86300 | ν7 = 41.5 |
| r15 = 51.180 | d15 = 0.67 | | |
| r16 = 161.213 | d16 = 1.00 | n8 = 1.72342 | ν8 = 38.0 |
| r17 = 17.174 | d17 = 3.49 | n9 = 1.80518 | ν9 = 25.4 |
| r18 = −4559.135 | d18 = variable | | |
| r19 = 55.808 | d19 = 5.68 | n10 = 1.48749 | ν10 = 70.2 |
| r20 = −25.763 | d20 = 0.50 | n11 = 1.57159 | ν11 = 13.5 |
| *r21 = −30.372 | d21 = 0.15 | | |
| r22 = 134.832 | d22 = 1.20 | n12 = 1.83400 | ν12 = 37.2 |
| r23 = 18.611 | d23 = 6.95 | n13 = 1.48749 | ν13 = 70.2 |
| r24 = −56.393 | | | |

| Focal Length | 17.51 | 28.00 | 38.50 |
|---|---|---|---|
| Variable Interval | | | |
| d2 | 13.74 | 13.74 | 13.74 |
| d6 | 24.65 | 11.15 | 5.55 |
| d12 | 1.01 | 6.28 | 10.73 |
| d18 | 10.95 | 5.68 | 1.22 |

Aspherical Coefficient

1st surface b: 1.541946e−05  c: −1.703973e−08  d: 1.550544e−11
e: −3.917946e−15

4th surface b: 1.588787e−05  c: −1.398091e−08  d: 7.979067e−11

21st surface b: 8.893654e−06  c: 4.019287e−08  d: −2.818461e−10
e: 7.971370e−13

Refractive Index at Each Wavelength

| | d | g | c | f | νd | θgd | θgF |
|---|---|---|---|---|---|---|---|
| G1 | 1.58313 | 1.59528 | 1.58013 | 1.58995 | 59.4 | 1.237 | 0.543 |
| G2 | 1.77250 | 1.79197 | 1.76780 | 1.78337 | 49.6 | 1.250 | 0.552 |
| G3 | 1.84666 | 1.89386 | 1.83655 | 1.87193 | 23.9 | 1.334 | 0.620 |
| G4 | 1.84666 | 1.89386 | 1.83655 | 1.87193 | 23.9 | 1.334 | 0.620 |
| G5 | 1.51633 | 1.52621 | 1.51386 | 1.52191 | 64.1 | 1.227 | 0.534 |
| G6 | 1.67790 | 1.69314 | 1.67419 | 1.68644 | 55.3 | 1.244 | 0.547 |
| G7 | 1.86300 | 1.88938 | 1.85682 | 1.87760 | 41.5 | 1.269 | 0.567 |
| G8 | 1.72342 | 1.74800 | 1.71782 | 1.73688 | 38.0 | 1.290 | 0.583 |
| G9 | 1.80518 | 1.84729 | 1.79611 | 1.82777 | 25.4 | 1.330 | 0.617 |
| G10 | 1.48749 | 1.49596 | 1.48534 | 1.49228 | 70.2 | 1.220 | 0.530 |
| G11(GIT) | 1.57159 | 1.61267 | 1.55583 | 1.59815 | 13.5 | 0.970 | 0.343 |
| G12 | 1.83400 | 1.86278 | 1.82738 | 1.84982 | 37.2 | 1.283 | 0.578 |
| G13 | 1.48749 | 1.49596 | 1.48534 | 1.49228 | 70.2 | 1.220 | 0.530 |

(Numerical Embodiment 3)
f = 20.6–34.1 Fno = 1:3.6–4.6 2ω = 92.8°–64.8°

| | | | |
|---|---|---|---|
| r1 = 77.005 | d1 = 4.10 | n1 = 1.62299 | ν1 = 58.1 |
| r2 = 236.410 | d2 = 0.10 | | |
| r3 = 57.918 | d3 = 1.70 | n2 = 1.78590 | ν2 = 44.2 |
| r4 = 22.654 | d4 = variable | | |
| r5 = 39.007 | d5 = 1.40 | n3 = 1.80610 | ν3 = 41.0 |
| r6 = 16.676 | d6 = 4.68 | | |
| r7 = 116.102 | d7 = 1.30 | n4 = 1.77250 | ν4 = 49.6 |
| r8 = 32.443 | d8 = 2.80 | | |
| r9 = 25.533 | d9 = 3.00 | n5 = 1.84666 | ν5 = 23.8 |
| r10 = 62.480 | d10 = variable | | |
| r11 = 62.563 | d11 = 2.20 | n6 = 1.58313 | ν6 = 59.4 |
| r12 = −61.416 | d12 = 1.78 | | |
| r13 = (stop) | d13 = 0.92 | | |
| r14 = 42.340 | d14 = 6.90 | n7 = 1.62606 | ν7 = 39.2 |
| r15 = −67.037 | d15 = 3.50 | | |
| r16 = −16.291 | d16 = 2.50 | n8 = 1.84666 | ν8 = 23.8 |
| r17 = −75.129 | d17 = 3.80 | n9 = 1.78590 | ν9 = 44.2 |
| r18 = −19.960 | d18 = 0.20 | | |
| r19 = 50.544 | d19 = 1.20 | n10 = 1.83481 | ν10 = 42.7 |
| r20 = 24.163 | d20 = 1.73 | | |
| r21 = −148.267 | d21 = 2.50 | n11 = 1.48749 | ν11 = 70.2 |
| r22 = −25.814 | d22 = 0.20 | | |
| r23 = 117.509 | d23 = 2.15 | n12 = 1.48749 | ν12 = 70.2 |
| r24 = −61.461 | d24 = 0.50 | n13 = 1.59629 | ν13 = 13.9 |
| r25 = −109.320 | d25 = variable | | |
| r26 = ∞ | | | |

| Focal Length | 20.62 | 24.00 | 34.07 |
|---|---|---|---|
| Variable Interval | | | |
| d4 | 7.85 | 9.85 | 7.85 |
| d10 | 16.78 | 10.47 | 1.47 |
| d25 | 0.00 | 4.31 | 15.31 |

Refractive Index at Each Wavelength

| | d | g | c | f | νd | θgd | θgF |
|---|---|---|---|---|---|---|---|
| G1 | 1.62299 | 1.63630 | 1.61974 | 1.63045 | 58.2 | 1.243 | 0.546 |
| G2 | 1.78590 | 1.80839 | 1.78059 | 1.79837 | 44.2 | 1.265 | 0.564 |
| G3 | 1.80610 | 1.83115 | 1.80025 | 1.81994 | 40.2 | 1.272 | 0.569 |
| G4 | 1.77250 | 1.79196 | 1.76780 | 1.78337 | 49.6 | 1.250 | 0.552 |
| G5 | 1.84666 | 1.89421 | 1.83649 | 1.87210 | 23.8 | 1.335 | 0.621 |
| G6 | 1.58313 | 1.59530 | 1.58014 | 1.58996 | 59.4 | 1.239 | 0.544 |
| G7 | 1.62606 | 1.64655 | 1.62135 | 1.63732 | 39.2 | 1.283 | 0.578 |
| G8 | 1.84666 | 1.89421 | 1.83649 | 1.87210 | 23.8 | 1.335 | 0.621 |
| G9 | 1.78590 | 1.80839 | 1.78059 | 1.79837 | 44.2 | 1.265 | 0.564 |
| G10 | 1.83481 | 1.85953 | 1.82897 | 1.84851 | 42.7 | 1.265 | 0.564 |
| G11 | 1.48749 | 1.49596 | 1.48534 | 1.49228 | 70.2 | 1.220 | 0.530 |
| G12 | 1.48749 | 1.49596 | 1.48534 | 1.49228 | 70.2 | 1.220 | 0.530 |
| G13(GIT) | 1.59629 | 1.63830 | 1.58040 | 1.62342 | 13.9 | 0.976 | 0.346 |

(Numerical Embodiment 4)
f = 22.9–52.9 Fno = 1:3.9–5.9 2ω = 86.8°–44.5°

| | | | |
|---|---|---|---|
| r1 = 36.615 | d1 = 1.44 | n1 = 1.80610 | ν1 = 40.9 |
| r2 = 15.544 | d2 = 0.54 | n2 = 1.59629 | ν2 = 13.9 |
| r3 = 16.027 | d3 = 7.39 | | |
| r4 = 165.372 | d4 = 1.20 | n3 = 1.71999 | ν3 = 50.2 |
| r5 = 21.580 | d5 = 0.09 | n4 = 1.51282 | ν4 = 50.9 |
| *r6 = 18.642 | d6 = 2.62 | | |
| r7 = 24.450 | d7 = 4.30 | n5 = 1.74077 | ν5 = 27.8 |
| r8 = 152.272 | d8 = variable | | |
| r9 = 25.619 | d9 = 2.60 | n6 = 1.51742 | ν6 = 52.4 |
| r10 = −62.378 | d10 = 0.60 | | |
| r11 = (stop) | d11 = 0.60 | | |
| r12 = 20.136 | d12 = 3.50 | n7 = 1.51742 | ν7 = 52.4 |
| r13 = −177.115 | d13 = 0.43 | | |
| r14 = −37.539 | d14 = 7.50 | n8 = 1.72825 | ν8 = 28.5 |
| r15 = 17.433 | d15 = 1.93 | | |
| r16 = 58.669 | d16 = 2.50 | n9 = 1.57099 | ν9 = 50.8 |
| r17 = −21.352 | d17 = variable | | |
| r18 = 0.000 | d18 = variable | | |

-continued

| | | | |
|---|---|---|---|
| r19 = −36.137 | d19 = 1.00 | n10 = 1.71999 | ν10 = 50.2 |
| r20 = 70.937 | d20 = 0.63 | | |
| r21 = 236.020 | d21 = 3.40 | n11 = 1.71300 | ν11 = 53.9 |
| r22 = −29.793 | | | |

| Focal Length | 22.90 | 35.05 | 52.88 |
|---|---|---|---|

Variable Interval

| | | | |
|---|---|---|---|
| d8 | 26.27 | 10.86 | 1.07 |
| d17 | 0.00 | 4.13 | 10.20 |
| d18 | 1.80 | 7.88 | 16.80 |

Aspherical Coefficient
6th surface b: −2.238197e−05  c: −1.062584e−07  d: 3.098938e−10
e: −1.455066e−12

Refractive Index at Each Wavelength

| | d | g | c | f | νd | θgd | θgF |
|---|---|---|---|---|---|---|---|
| G1 | 1.80610 | 1.83117 | 1.80025 | 1.81994 | 40.9 | 1.273 | 0.570 |
| G2(GIT) | 1.59629 | 1.63830 | 1.58040 | 1.62342 | 13.9 | 0.976 | 0.346 |
| G3 | 1.71999 | 1.73795 | 1.71568 | 1.73001 | 50.2 | 1.253 | 0.554 |
| G4 | 1.51282 | 1.52552 | 1.50980 | 1.51988 | 50.9 | 1.260 | 0.560 |
| G5 | 1.74077 | 1.77599 | 1.73309 | 1.75975 | 27.8 | 1.321 | 0.609 |
| G6 | 1.51742 | 1.52980 | 1.51444 | 1.52431 | 52.4 | 1.254 | 0.556 |
| G7 | 1.51742 | 1.52980 | 1.51444 | 1.52431 | 52.4 | 1.254 | 0.556 |
| G8 | 1.72825 | 1.76200 | 1.72086 | 1.74645 | 28.5 | 1.319 | 0.608 |
| G9 | 1.57099 | 1.58514 | 1.56762 | 1.57886 | 50.8 | 1.259 | 0.559 |
| G10 | 1.71999 | 1.73795 | 1.71568 | 1.73001 | 50.2 | 1.253 | 0.554 |
| G11 | 1.71300 | 1.72943 | 1.70897 | 1.72221 | 53.9 | 1.241 | 0.545 |

(Numerical Embodiment 5)
f = 28.8–34.4 Fno = 1:1.8–2.1 2ω = 46.9°–39.9°

| | | | |
|---|---|---|---|
| r1 = 479.991 | d1 = 2.39 | n1 = 1.77534 | ν1 = 50.2 |
| r2 = −174.256 | d2 = 0.15 | | |
| r3 = 113.827 | d3 = 1.50 | n2 = 1.78000 | ν2 = 50.0 |
| r4 = 28.536 | d4 = 4.08 | | |
| r5 = −142.555 | d5 = 1.50 | n3 = 1.83417 | ν3 = 37.0 |
| r6 = 54.349 | d6 = variable | | |
| r7 = 250.553 | d7 = 3.40 | n4 = 1.77562 | ν4 = 50.2 |
| r8 = −52.927 | d8 = 0.29 | | |
| r9 = 36.084 | d9 = 1.50 | n5 = 1.48700 | ν5 = 70.4 |
| r10 = 17.823 | d10 = 4.71 | n6 = 1.73822 | ν6 = 39.4 |
| r11 = 71.782 | d11 = variable | | |
| r12 = (stop) | d12 = 0.00 | | |
| r13 = 47.077 | d13 = 2.43 | n7 = 1.49198 | ν7 = 69.8 |
| r14 = −259.854 | d14 = variable | | |
| r15 = −83.027 | d15 = 1.50 | n8 = 1.54337 | ν8 = 65.1 |
| r16 = 36.053 | d16 = variable | | |
| r17 = −13.389 | d17 = 1.50 | n9 = 1.85000 | ν9 = 23.0 |
| r18 = −47.648 | d18 = 4.77 | n10 = 1.76938 | ν10 = 50.5 |
| r19 = −18.838 | d19 = 0.15 | | |
| r20 = −345.897 | d20 = 4.40 | n11 = 1.78000 | ν11 = 50.0 |
| r21 = −37.216 | d21 = variable | | |
| *r22 = 84.335 | d22 = 0.01 | n12 = 1.57160 | ν12 = 13.5 |
| r23 = 66.832 | d23 = 4.81 | n13 = 1.78000 | ν13 = 50.0 |
| r24 = −96.327 | d24 = 1.82 | | |
| r25 = ∞ | d25 = 41.50 | n14 = 1.62299 | ν14 = 58.2 |
| r26 = ∞ | d26 = 2.60 | n15 = 1.51633 | ν15 = 64.1 |
| r27 = ∞ | | | |

| Focal Length | 28.82 | 31.32 | 34.44 |
|---|---|---|---|

Variable Interval

| | | | |
|---|---|---|---|
| d6 | 4.27 | 3.07 | 1.75 |
| d11 | 11.15 | 10.85 | 8.44 |
| d14 | 1.85 | 4.76 | 8.77 |

-continued

| | | | |
|---|---|---|---|
| d16 | 11.74 | 8.55 | 6.00 |
| d21 | 0.50 | 2.29 | 4.55 |

Aspherical Coefficient
22nd surface k: −7.027492e+00
b: −1.183492e−06  c: 2.606798e−10  d: −5.197561e−12
e: 6.728677e−15

Refractive Index at Each Wavelength

| | d | g | c | f | νd | θgd | θgF |
|---|---|---|---|---|---|---|---|
| G1 | 1.77534 | 1.79482 | 1.77071 | 1.78617 | 50.2 | 1.261 | 0.560 |
| G2 | 1.78000 | 1.79968 | 1.77533 | 1.79094 | 50.0 | 1.261 | 0.560 |
| G3 | 1.83417 | 1.86331 | 1.82755 | 1.85013 | 36.9 | 1.291 | 0.584 |
| G4 | 1.77562 | 1.79511 | 1.77099 | 1.78646 | 50.2 | 1.261 | 0.560 |
| G5 | 1.48700 | 1.49541 | 1.48486 | 1.49178 | 70.4 | 1.215 | 0.524 |
| G6 | 1.73823 | 1.76233 | 1.73271 | 1.75146 | 39.4 | 1.285 | 0.579 |
| G7 | 1.49198 | 1.50055 | 1.48980 | 1.49685 | 69.8 | 1.216 | 0.525 |
| G8 | 1.54337 | 1.55361 | 1.54081 | 1.54916 | 65.1 | 1.227 | 0.533 |
| G9 | 1.85000 | 1.89888 | 1.83941 | 1.87638 | 23.0 | 1.322 | 0.608 |
| G10 | 1.76938 | 1.78861 | 1.76482 | 1.78007 | 50.4 | 1.260 | 0.560 |
| G11 | 1.78000 | 1.79968 | 1.77533 | 1.79094 | 50.0 | 1.261 | 0.560 |
| G12(GIT) | 1.57315 | 1.61272 | 1.55531 | 1.59810 | 13.4 | 0.925 | 0.342 |
| G13 | 1.78000 | 1.79968 | 1.77533 | 1.79094 | 50.0 | 1.261 | 0.560 |
| G14 | 1.62299 | 1.63630 | 1.61974 | 1.63045 | 58.2 | 1.242 | 0.546 |
| G15 | 1.51633 | 1.52621 | 1.51386 | 1.52191 | 64.1 | 1.228 | 0.535 |

(Numerical Embodiment 6)
f = 28.8–34.4 Fno = 1:1.8–2.0 2ω = 46.9°–39.9°

| | | | |
|---|---|---|---|
| r1 = −1000.000 | d1 = 3.12 | n1 = 1.77583 | ν1 = 44.6 |
| r2 = −75.204 | d2 = 0.30 | n2 = 1.57160 | ν2 = 13.5 |
| *r3 = −52.577 | d3 = 0.15 | | |
| (aspherical surface) | | | |
| r4 = 95.547 | d4 = 1.50 | n3 = 1.72355 | ν3 = 52.7 |
| r5 = 22.798 | d5 = 5.43 | | |
| r6 = −47.470 | d6 = 1.50 | n4 = 1.83007 | ν4 = 37.9 |
| r7 = 143.093 | d7 = variable | | |
| r8 = −466.401 | d8 = 2.77 | n5 = 1.82288 | ν5 = 39.2 |
| r9 = −49.985 | d9 = 0.15 | | |
| r10 = 32.665 | d10 = 1.50 | n6 = 1.48700 | ν6 = 70.4 |
| r11 = 22.659 | d11 = 3.20 | n7 = 1.83364 | ν7 = 34.0 |
| r12 = 53.494 | d12 = variable | | |
| r13 = 25.138 | d13 = 3.72 | n8 = 1.48700 | ν8 = 70.4 |
| r14 = −177.500 | d14 = variable | | |
| r15 = (stop) | d15 = 2.04 | | |
| r16 = 104.736 | d16 = 1.50 | n9 = 1.66301 | ν9 = 30.9 |
| r17 = 19.977 | d17 = variable | | |
| r18 = −13.506 | d18 = 1.50 | n10 = 1.79814 | ν10 = 28.5 |
| r19 = 82.460 | d19 = 6.03 | n11 = 1.59085 | ν11 = 61.9 |
| r20 = −19.280 | d20 = 0.52 | | |
| r21 = −2066.276 | d21 = 5.05 | n12 = 1.78000 | ν12 = 50.0 |
| r22 = −32.904 | d22 = variable | | |
| r23 = 66.123 | d23 = 4.50 | n13 = 1.80841 | ν13 = 42.1 |
| r24 = −132.913 | d24 = 1.82 | | |
| r25 = ∞ | d25 = 41.50 | n14 = 1.62299 | ν14 = 58.2 |
| r26 = ∞ | d26 = 2.60 | n15 = 1.51633 | ν15 = 64.1 |
| r27 = ∞ | | | |

| Focal Length | 28.82 | 31.27 | 34.43 |
|---|---|---|---|

Variable Interval

| | | | |
|---|---|---|---|
| d7 | 4.86 | 3.37 | 1.87 |
| d12 | 8.34 | 5.82 | 2.50 |
| d14 | 1.85 | 3.68 | 5.80 |

-continued

| | | | |
|---|---|---|---|
| d17 | 8.57 | 8.38 | 7.95 |
| d22 | 0.50 | 2.87 | 6.00 |

Aspherical Coefficient
3rd surface

| | | |
|---|---|---|
| k: −8.785724e+00 | | |
| b: 1.117266e−06 | c: 2.767939e−09 | d: −1.361241e−11 |
| e: 2.009707e−14 | | |

Refractive Index at Each Wavelength

| | d | g | c | f | νd | θgd | θgF |
|---|---|---|---|---|---|---|---|
| G1 | 1.77583 | 1.79800 | 1.77067 | 1.78807 | 44.6 | 1.273 | 0.570 |
| G2 | 1.57315 | 1.61272 | 1.55531 | 1.59810 | 13.4 | 0.925 | 0.342 |
| G3 | 1.72355 | 1.74078 | 1.71942 | 1.73315 | 52.7 | 1.255 | 0.556 |
| G4 | 1.83008 | 1.85834 | 1.82364 | 1.84557 | 37.8 | 1.289 | 0.582 |
| G5 | 1.82288 | 1.84991 | 1.81670 | 1.83773 | 39.1 | 1.286 | 0.580 |
| G6 | 1.48700 | 1.49541 | 1.48486 | 1.49178 | 70.4 | 1.215 | 0.524 |
| G7 | 1.83364 | 1.86549 | 1.82648 | 1.85103 | 34.0 | 1.297 | 0.589 |
| G8 | 1.48700 | 1.49541 | 1.48486 | 1.49178 | 70.4 | 1.215 | 0.524 |
| G9 | 1.66301 | 1.69104 | 1.65677 | 1.67826 | 30.9 | 1.304 | 0.595 |
| G10 | 1.79814 | 1.83478 | 1.79006 | 1.81803 | 28.5 | 1.310 | 0.599 |
| G11 | 1.59085 | 1.60264 | 1.58794 | 1.59749 | 61.9 | 1.234 | 0.539 |
| G12 | 1.78000 | 1.79968 | 1.77533 | 1.79094 | 50.0 | 1.261 | 0.560 |
| G13 | 1.80841 | 1.83296 | 1.80274 | 1.82194 | 42.1 | 1.279 | 0.574 |
| G14 | 1.62299 | 1.63630 | 1.61974 | 1.63045 | 58.2 | 1.242 | 0.546 |
| G15 | 1.51633 | 1.52621 | 1.51386 | 1.52191 | 64.1 | 1.228 | 0.535 |

TABLE 1

| Conditional Expression | Embodiment | | | | | |
|---|---|---|---|---|---|---|
| | 1 | 2 | 3 | 4 | 5 | 6 |
| (4) | 9.14 | 7.58 | 5.41 | 4.72 | 4.18 | 4.18 |
| (5) | 0.022 | — | — | 0.038 | — | 0.096 |
| (6) | — | −0.057 | −0.087 | — | −0.052 | — |

This application claims priority from Japanese Patent Application No. 2004-132609 filed on Apr. 28, 2004, which is hereby incorporated by reference herein

What is claimed is:

1. An optical system comprising:
a refractive optical element composed of a solid material that satisfies the following conditions:

$\nu d < 30$ $\theta gd < -3.333 \times 10^{-3} \cdot \nu d + 1.40$ $\theta gF < -2.615 \times 10^{-3} \cdot \nu d + 0.67$ where νd is the Abbe constant of the solid material, and θgd and θgF are partial dispersion ratios of the solid material,
wherein, in the optical system, height from the optical axis of a point on the frontmost lens surface through which a paraxial marginal ray passes is smaller than the maximum value of heights from the optical axis of points on lens surfaces, on the rear side of an intersection P of the optical axis and a paraxial chief ray, through which the paraxial marginal ray passes, and
in the case that the refractive optical element is disposed on the front side of the intersection P, the refractive optical element has a positive refractive power, and in the case that the refractive optical element is disposed on the rear side of the intersection P, the refractive optical element has a negative refractive power.

2. An optical system according to claim 1, wherein the optical system satisfies the following condition:

$2 < OTL/f < 15$ where OTL is the total optical length of the optical system, and f is the focal length of the optical system.

3. An optical system according to claim 1, wherein in the case that said refractive optical system is disposed on the front side of the intersection P, the optical system satisfies the following condition:

$0.01 < \phi GIT/\phi < 0.12$ where φGIT is the refractive power of the refractive optical element, and φ is the refractive power of the optical system as a whole.

4. An optical system according to claim 1, wherein in the case that said refractive optical system is disposed on the rear side of the intersection, the optical system satisfies the following condition:

$-0.2 < \phi GIT/\phi < -0.02$ where φGIT is the refractive power of the refractive optical element, and φ is the refractive power of the optical system as a whole.

5. An optical system according to claim 1, wherein said solid material comprises a mixture in which inorganic fine particles are dispersed in a transparent medium.

6. An optical system according to claim 5, wherein said inorganic fine particles are ITO fine particles.

7. An optical system comprising:
a refractive optical element composed of a solid material that satisfies the following conditions:

$\nu d < 30$ $\theta gd < -3.333 \times 10^{-3} \cdot \nu d + 1.40$ $\theta gF < -2.615 \times 10^{-3} \cdot \nu d + 0.67$ where νd is the Abbe constant of the solid material, and θgd and θgF are partial dispersion ratios of the solid material; and
an aperture stop,
wherein, in the case that the refractive optical element is disposed on the front side of the aperture stop, the refractive optical element has a positive refractive power, and in the case that said refractive optical element is disposed on the rear side of the aperture stop, the refractive optical element has a negative refractive power, and
the optical system satisfies the following condition:

$2 < OTL/f < 15$ where OTL is the total optical length of the optical system, and f is the focal length of the optical system.

8. A retrofocus type optical system comprising:
a refractive optical element composed of a solid material that satisfies the following conditions:

$\nu d < 30$ $\theta gd < -3.333 \times 10^{-3} \cdot \nu d + 1.40$ $\theta gF < -2.615 \times 10^{-3} \cdot \nu d + 0.67$ where νd is the Abbe constant of the solid material, and θgd and θgF are partial dispersion ratios of the solid material; and an aperture stop, wherein, in the case that the refractive optical element is disposed on the front side of the aperture stop, the refractive optical element has a positive refractive power, and in the case that the refractive optical element is disposed on the rear side of the aperture stop, the refractive optical element has a negative refractive power.

* * * * *